(12) United States Patent
Kimura

(10) Patent No.: US 6,501,905 B1
(45) Date of Patent: Dec. 31, 2002

(54) FILE MANAGEMENT APPARATUS AND METHOD, AND RECORDING MEDIUM INCLUDING SAME

(75) Inventor: Tetsu Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/391,278

(22) Filed: Sep. 7, 1999

(30) Foreign Application Priority Data

Sep. 8, 1998 (JP) .......................................... 10-253471

(51) Int. Cl.⁷ .............................................. H04N 5/781

(52) U.S. Cl. .......................... 386/126; 386/125; 386/46; 345/543; 711/170

(58) Field of Search ............................. 386/52, 55, 46, 386/95, 125–126, 111, 112; 345/723, 629, 634, 335, 531, 543; 707/203, 500.1; 711/170, 173, 171, 172; H04N 5/781

(56) References Cited

U.S. PATENT DOCUMENTS

| | | | | |
|---|---|---|---|---|
| 5,047,918 A | * | 9/1991 | Schwartz et al. | ........... 707/203 |
| 5,113,517 A | * | 5/1992 | Beard et al. | ................. 345/543 |
| 5,550,970 A | * | 8/1996 | Cline et al. | .................. 345/772 |
| 5,659,793 A | * | 8/1997 | Escobar et al. | ............. 345/629 |
| 5,771,330 A | * | 6/1998 | Takano et al. | ................. 386/52 |
| 5,937,138 A | * | 8/1999 | Fukuda et al. | .............. 386/112 |

* cited by examiner

*Primary Examiner*—Vincent Boccio
(74) *Attorney, Agent, or Firm*—Frommer Lawrence & Haug LLP; William S. Frommer; Gordon Kessler

(57) ABSTRACT

A file management apparatus and method for managing the files of audio and/or video data to be recorded on or reproduced from a recording medium. The file management apparatus includes a first apparatus for managing a master file recorded on the medium and a second apparatus for designating at least part of the master as at least shared element. The apparatus also includes a third apparatus for managing one or more of the shared elements as one or more shared files in order to enable a plurality of the shared files to refer to the same shared element.

48 Claims, 13 Drawing Sheets

FIG. 8

```
< Spare Area Information > 0 +
[ Logical Volume Information ] {
        < Logical Volume Information Header >
        < Partition Map > + 1
} 1 +
[ Defect List Information ] {
        < Defect List Information Header >
        [ Defect Lists ] {
                @APS < Primary Defect List > 0 + 1
                @APS < Secondary Defect List > 0 + 1
        } 1 +
} 0 + 1

```
[ Media Information Descriptor ] {
      < Media Information Descriptor Header >
      < Zone Information > 0 +
}
```

FIG. 10

[ Drive Information Descriptor ] {
    < Drive Information Descriptor Header >
}

FIG. 11

[ Extended Data Descriptor ] {
    < Extended Data Descriptor Header >
    [ Extended Data Set ] {
        @APS < Extended Data > 0 +
    }
}

FIG. 14

```
[ File Table ] {
      < File Table Header >
      < File Table Data >
}
```

FIG. 15

```
[ File Table ] {
      < File Table Header >
      < File  Record > 1 +
}
```

FIG. 16

```
[ Allocation Extents Table ] {
       < Allocation Extents Table Header >
       < Allocation Extent Record > 0 +
}
```

FIG. 17

[ Allocation Strategy Table ] {
 < Allocaation Strategy Table Header >
 < Allocation Strategy Record > 1 +
}

FIG. 18

[ Extended Attribute Table ] {
 < Extended Attribute Table Header >
 < Extended Attribute Record > 1 +
}

FILE MANAGEMENT APPARATUS AND METHOD, AND RECORDING MEDIUM INCLUDING SAME

BACKGROUND OF THE INVENTION

The present invention relates generally to a file management apparatus and method, and a recording medium embodying the apparatus and method, and more particularly to a file management apparatus and method for managing the files of data to be recorded on or reproduced from a disk.

One prior art file system for recording data on a disk recording medium is described as ISO/IEC13346 (1995), "Information Technology—Volume and File Structure of Write-Once and Rewritable Media using Non-sequential Recording for Information Interchange". This is an industrial-strength file system, and includes a multi-purpose file system for recording various types of data. This is not an efficient system for home use to record compressed digital AV (audio and video) signals on a disk.

During home use, after one or more AV signals have been recorded to a disk, they may need to be edited by being divided or combined together. It may also be necessary that the same AV signals be referred to by a plurality of program sequences. For example, one or more edited sequences may require playback of a same portion of a recorded AV signal. In a conventional file system, editing including the division or combination of recorded AV signals is complicated, and often requires that data must be copied and redundantly stored multiple times on the recording medium, once for each time the AV signal is to be used by a program sequence file, so that a plurality of files may refer to the same recorded data.

The present invention has been made in view of the above-described circumstances, and is intended to facilitate editing of recorded AV signals and to enable a plurality of files to refer to the same recorded data without the need of redundantly copying and storing the data.

OBJECTS OF THE INVENTION

Accordingly, it is an object of the invention to provide an improved apparatus and method for recording AV signals that are to be later subjected to various editing procedures.

Another object of the invention is to provide an improved apparatus and method for editing recorded AV signals so that one or more files may refer to these recorded AV signals without requiring that these AV signals be redundantly recorded more than once on a recording medium.

Still other objects and advantages of the invention will in part be obvious and will in part be apparent from the specification and the drawings.

SUMMARY OF THE INVENTION

Generally speaking, in accordance with the invention, a file management apparatus and method is provided for managing the files of audio and/or video data to be recorded on or reproduced from a recording medium. The file management apparatus and method includes a first management apparatus for managing a master file recorded on a recording medium, a second management apparatus for designating at least part of the master file as at least one shared element, and a third management apparatus for managing one or more of the shared elements as part of one or more shared files so that a plurality of shared files can refer to the same shared element without the shared element being redundantly copied on the recording medium.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 8 is an illustration of a volume structure descriptor in accordance with the invention;

FIG. 9 is an illustration of a media information descriptor in accordance with the invention;

FIG. 10 is an illustration of a drive information descriptor in accordance with the invention;

FIG. 11 is an illustration of an extended data descriptor in accordance with the invention;

FIG. 14 is an illustration of a file table in accordance with the invention;

FIG. 15 is an illustration of a file table of File Table Structure Type 0 in accordance with the invention;

FIG. 16 is an illustration of an allocation extents table in accordance with the invention;

FIG. 17 is an illustration of an allocation strategy table in accordance with the invention;

FIG. 18 is an illustration of an extended attribute table in accordance with the invention;

DETAILED DESCRIPTION OF THE PREFERRED EMBODIMENTS

Figure 1:
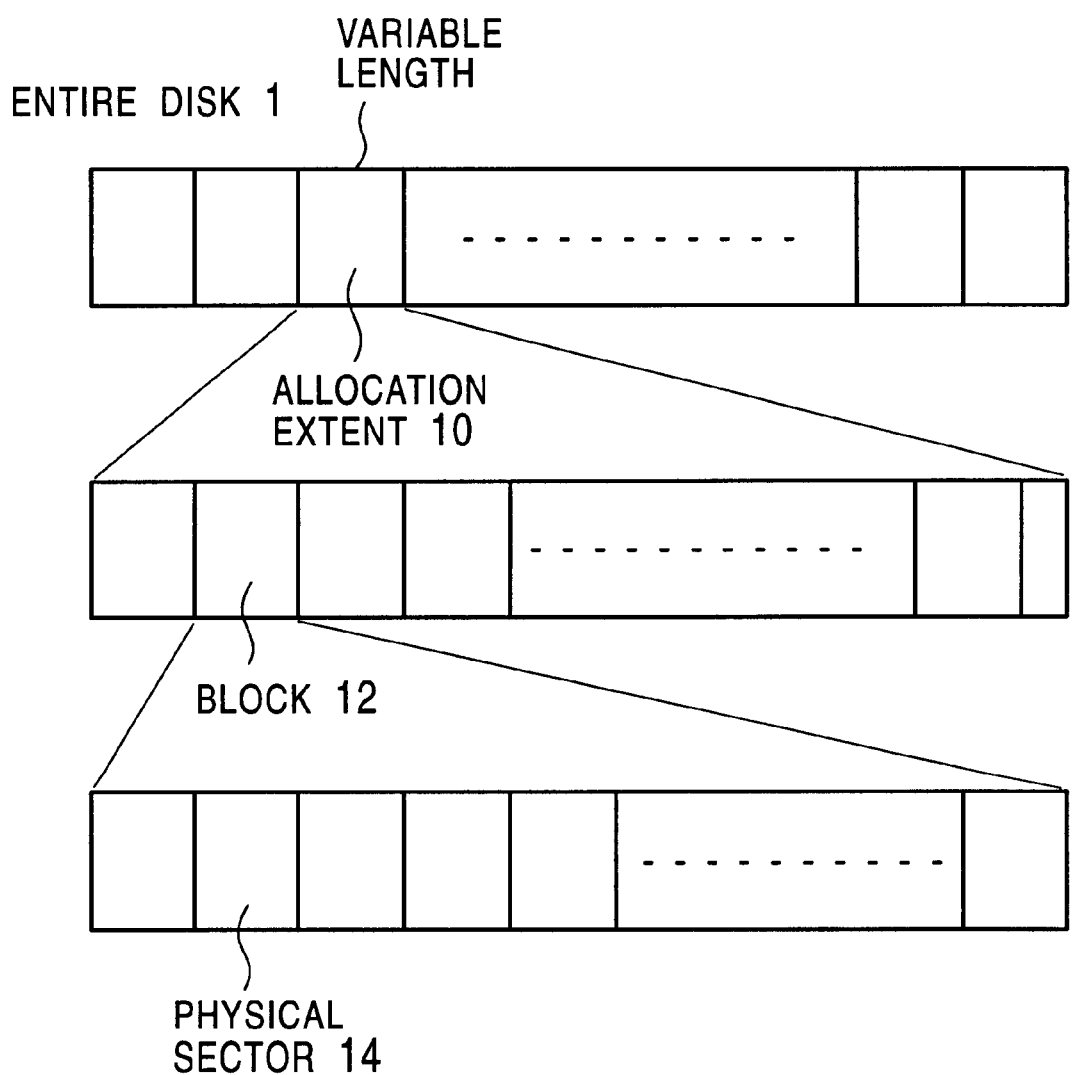
FIG. 1 depicts the format and structure of a disk recording medium in accordance with the invention.

Referring first to FIG. 1, a format for a system for recording data on a disk-recording medium will be described. FIG. 1 illustrates the format of an entire disk recording medium 1. Disk 1 is divided into a plurality of allocation extents 10 of variable length. Each allocation extent consists of a plurality of blocks 12 having a fixed length. Each block 12 in turn consists of a predetermined number of physical sectors 14.

Figure 2:
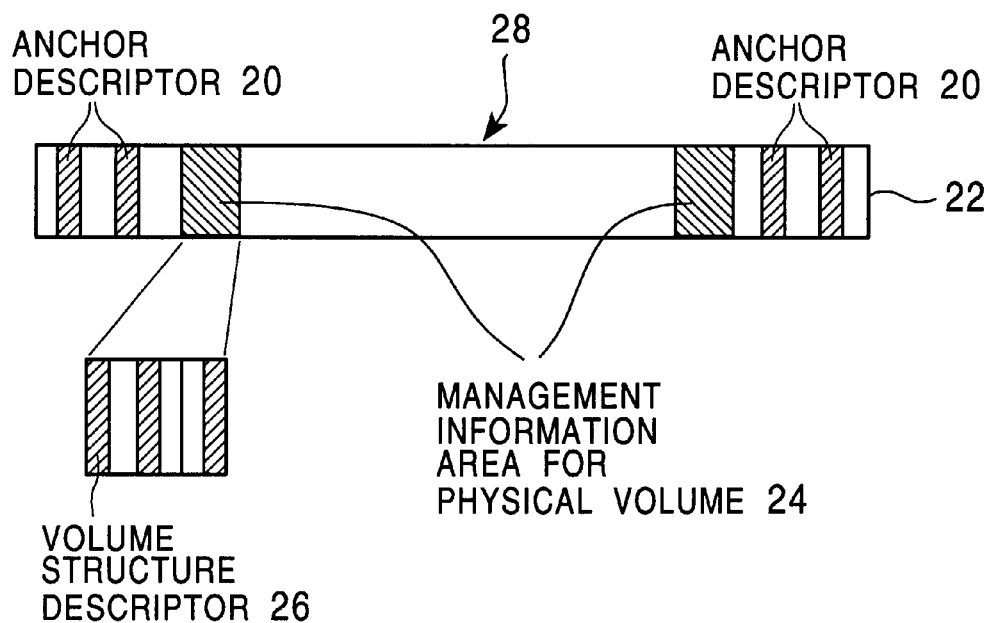
FIG. 2 depicts a physical volume of the disk recording medium of FIG. 1, including anchor descriptors and other recorded information.

FIG. 2 depicts a physical volume 28 of a disk recording medium 22 which is a portion of disk 1. A physical volume of a disk recording medium is a physical portion of the recording medium having an actual physical boundary. For example, in a recording medium including a plurality of individual disk media, a physical volume might comprise a single disk. In a recording medium having a single, two sided disk, a physical volume might comprise one side of the disk. In a recording medium including a single, one sided disk, a physical volume might comprise one or more tracks, or any other user-defined physical division of the disk. A plurality of anchor descriptors 20 are used in conjunction with a disk recording medium 22. Four anchor descriptors 20 are positioned within each physical volume of disk recording medium 22. Also recorded within each physical volume is at least one physical volume management information area 24. In each anchor descriptor 20, the location of each physical volume management information area 24 is recorded. A volume structure descriptor 26 is included in each physical volume management information area 24. Each volume structure descriptor includes physical volume information, partition information, logical volume information, and a partition map depicting the location of various data within a particular partition (to be discussed below).

Also included in volume structure descriptor 26, is a definition of a user defined logical volume 30. A logical volume is a portion or portions of the disk recording medium that is treated as if it included a continuous portion of a recording medium, but need not be physically continuous. Thus, a logical volume may comprise any area or areas on a recording medium, but is accessed by a file system as if continuous. Each physical volume may include one or more logical volumes, and one logical volume may include all or part of one or more physical volumes.

Figure 3:
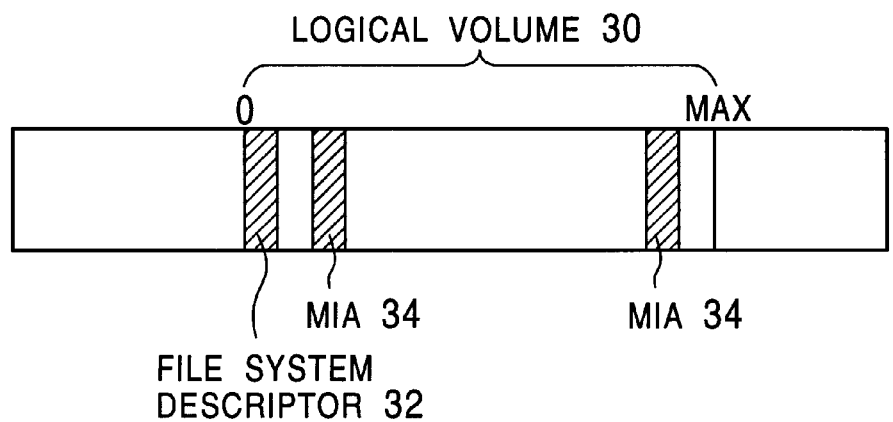
FIG. 3 depicts a logical volume of the disk recording medium of FIG. 1, including recorded information.

FIG. 3 illustrates logical volume 30 that extends from a logical bit location 0 to a logical bit location MAX. Each logical volume 30 includes a file system descriptor 32. Management information areas (MIAs) 34 are positioned near the start and end of each logical volume 30. Each MIA 34 includes a file table, an allocation extent table, an allocation strategy table, a defect information table, and an extended attribute table, as will be described below. The length of each allocation extent is described in an allocation strategy record included in the allocation strategy table.

Before recording data on the recording medium, the lengths of allocation extents used to record data on the recording medium is set by a user in accordance with the type of data to be recorded. For example, AV data is advantageously recorded in the format utilizing a longer allocation extent, while PC data can be recorded in the format using a shorter allocation extent. This is because the AV data are typically consecutive data in which a continuous stream of information is to be recorded, and then played back in the same order. Thus, by setting an allocation extent to be longer for the AV data, and thereby recording the AV data in longer, continuous strings, the data can be recorded or reproduced more efficiently.

Figure 4:
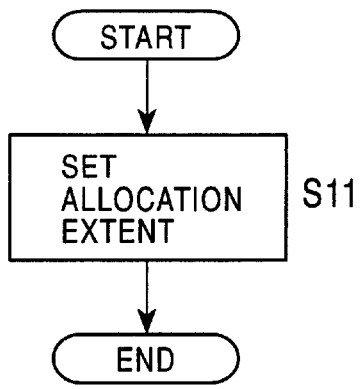
FIG. 4 is a flowchart illustrating processing for setting the length of an allocation extent in accordance with the invention.

FIG. 4 is a flowchart depicting the setting of possible lengths of an allocation extent to be used to record data on a recording medium. In step S11, in accordance with an input from a user, a driver 7 (described below) writes an allocation strategy record corresponding to the selected possible lengths of the allocation extent into a predetermined location of the allocation strategy table included in the MIA. Thus, in the allocation strategy table, a plurality of possible allocation strategy records are written.

Figure 5:
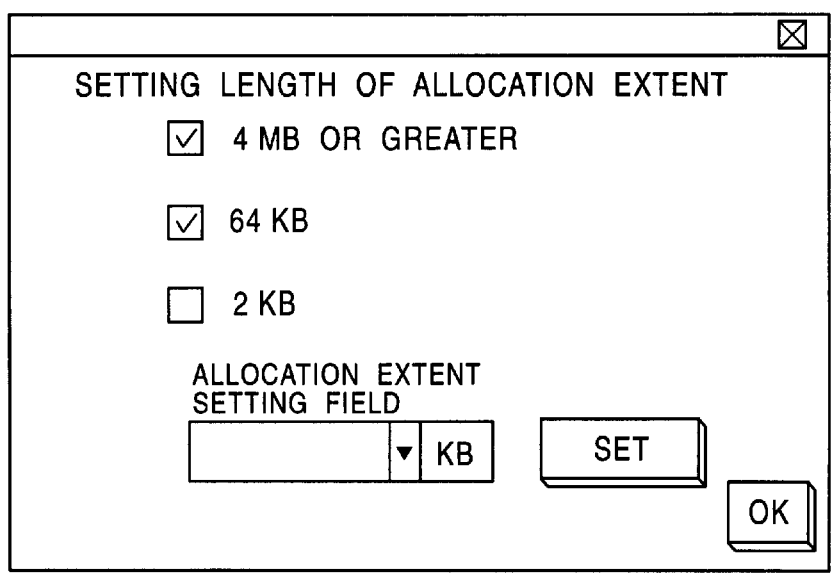
FIG. 5 is an example of a screen picture for setting the length of an allocation extent in accordance with the invention.

FIG. 5 shows an example of a screen in which the user selects the length of possible allocation extents. The length of each possible allocation extent can be set at a predetermined length such as 4 megabytes (MB) or greater, 64 kilobytes (KB), or 2 KB from a selection menu, or a plurality of other lengths can also be set by the user. Recording is performed for an entire disk in only one of the selected possible allocation extent formats. In accordance with this processing, possible allocation extents are selected and recorded in the allocation strategy table of the recording medium on the disk before data are recorded on the disk.

Figure 6:
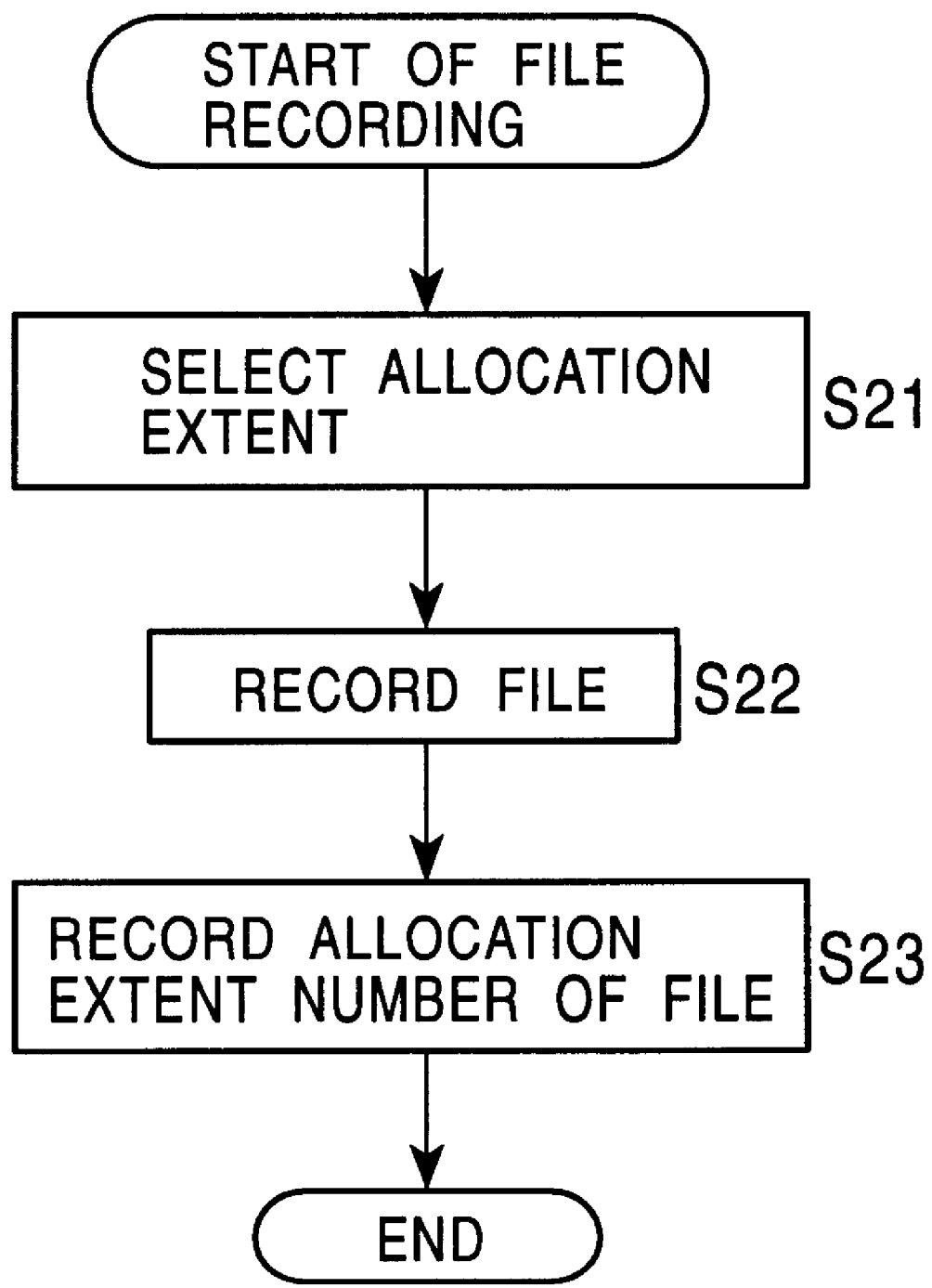
FIG. 6 is a flowchart illustrating file recording in accordance with the invention.
Figure 7:
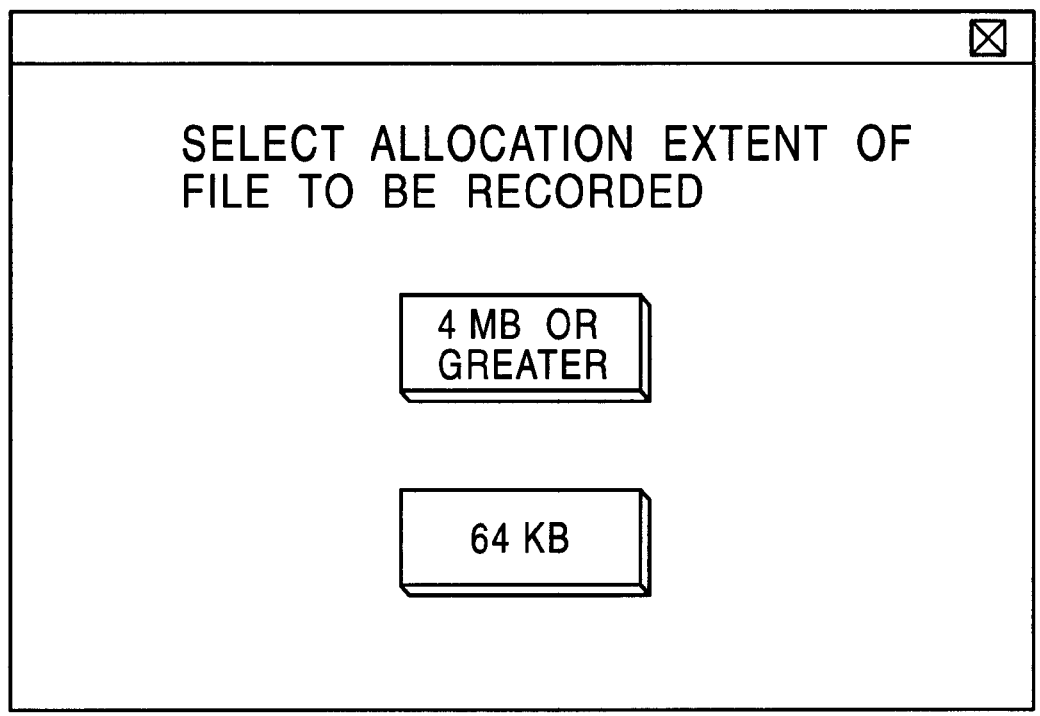
FIG. 7 is an example of a screen picture for selecting the length of an allocation extent in accordance with the invention.

Thereafter, a user sets one of the previously selected possible allocation extent for the entire recording medium disk, and then records data thereto, as is shown by the flowchart in FIG. 6. In step S21 of FIG. 6, the user actually sets an allocation extent length for the format in which data is to be recorded on the recording medium. FIG. 7 shows an example of a screen in which the user sets one allocation extent from among the previously selected possible allocation extent lengths. Only the previously selected possible values for the extent lengths are shown. By operating a button on the screen, the desired allocation extent length is set by the user. When AV data are recorded, by setting a longer allocation extent than that used in PC data recording, data can be recorded more efficiently as noted above. Based on the selection of the allocation extent length, an allocation strategy record positioned in the allocation strategy table is designated. Once the allocation strategy designation is completed, a recordation driver 7 records input AV, PC or other data on the disk in step S22. When data recording is completed, driver 7 records a number corresponding to the identity of the allocation extent in which the final data was recorded in step S23 so that the size and location of the recorded data is known. In an alternative embodiment, in the case where a system controller 5 (described below and shown in FIG. 19) can determine whether AV data or PC data is being input to be recorded, the above-described step S21 can be performed automatically without requiring a selection from the user.

The structure of information stored on a recording medium disk in accordance with the invention will now be described. A disk extent indication is stored within each MIA, and defines the size of each disk extent region that is to be used to store data, as is described above. The Disk Extent is recorded in the format shown in Table 1.

TABLE 1

Disk Extent

| BP | Length | Name | Contents |
|----|--------|------|----------|
| 0 | 2 | Offset (Number of MIBs) from Top of a Descriptor | Unit 16 |
| 2 | 2 | Length (Number of MIBs) | Unit 16 |

The Offset from Top of a Descriptor (RBP 0) indicates an offset (the number of management information blocks (MIBs)) from the start MIB of the MIA to the region of the MIA region including the disk extent. The Length (RBP 2) sets the size (the number of MIBs) of the disk extent region.

Two procedures may be used for detecting physical defects on the disk, as is known in the art. In accordance with each procedure, various information regarding defects is recorded. A primary defect list (PDL) entry is used to record the physical sector size of a physical sector to be used when testing for slipping. This is used as the procedure for determining whether a defect is present on the disk. The PDL entry is recorded in the physical volume MIA in the format shown in Table 2.

TABLE 2

PDL Entry

| BP | Length | Name | Contents |
|---|---|---|---|
| 0 | 4 | Physical Sector Number of Defective Sector | Unit 32 |

The Physical Sector Number of Defect Sector (RBP 0) sets the physical sector size of each physical sector on the disk, which is in turn used to detect slipping during recording or playback.

A secondary defect list (SDL) entry is used to record the physical sector number of a physical sector to be removed from use and replaced during linear replacement when such a linear replacement procedure is used to detect and avoid physical defects on the disk. Also stored is the physical sector number of an alternate physical sector to be used in place of the defective sector. The SDL Entry is recorded in the format shown in Table 3.

TABLE 3

SDL Entry

| BP | Length | Name | Contents |
|---|---|---|---|
| 0 | 4 | Physical Sector Number of Defect Sector | Unit 32 |
| 4 | 4 | Physical Sector Number of Spare Sector | Unit 32 |

The Physical Sector Number of Defect Sector entry in Table 3 designates the physical sector number of the physical sector to be linearly replaced because of the detection of a defect. The Physical Sector Number of Spare Sector (RBP 4) designates the physical sector number of an alternative physical sector to be used in place of the sector including the defect during linear replacement.

Anchor descriptors 20 are recorded as noted above as start points for volume structure analysis of each physical volume. Anchor descriptors 20 are recorded in each physical volume, but the actual location of these anchor descriptors is determined based upon the type of recording medium being used for defining the anchor positions in a read only memory (ROM) disk or a random access memory (RAM), the locations "Ch", "20h", "Last Physical Sector Number (LPSN)-20h", and "LPSN-Ch" (a value with "h" in its end represents a hexadecimal number) are used as anchor points. For a partial ROM disk, the locations "Ch", "20h", "LPSN-20h", and "LPSN-Ch" in each ROM or RAM region are used as anchor points. In this case, first the anchor descriptor locations in the RAM region are checked, and if present, they are used. If anchor descriptors are not found in the RAM region, then anchor descriptors from the ROM region are used.

The anchor descriptor is recorded from a byte position 0 in a particular physical sector at the location indicated above as an anchor point. The size of the anchor descriptor is not more than the size of a physical sector. A region extending from a byte following the last byte of the anchor descriptor to the end byte of the physical sector in which the anchor descriptor is located is reserved for future extension, and "#00" is set in all the bytes within this region. Each anchor descriptor includes the location within the physical volume that includes a main MIA region, a reserve MIA region, information of MIA maps, etc.

In each physical volume management information area 24 (MIA), various types of information regarding the structure of the associated physical volume are recorded. For ensuring reliability, two physical volume MIAs having identical information are redundantly recorded in each physical volume, and are called a "main MIA" and a "reserve MIA". Physical sectors in each physical volume MIA are called "management information blocks (MIBs)", and an offset of the number of MIBs from the first MIB of the physical volume MIA physical sector is called a "management information block (MIB) number". For designating a particular MIB within a physical volume, a MIB number is used. Each physical volume MIA includes MIBs that cannot be used because a defect or the like, MIBs that are not used yet, and MIBs that are used and thus include data therein. This data may comprise an MIA map for the main MIA, an MIA map for the reserve MIA, a volume structure descriptor, a media information descriptor, a drive information descriptor, or an extended data descriptor.

The purpose of the data stored within each of the MIBs within a particular physical volume MIA are recorded in the MIA map. The start positions and sizes of the main MIA and the reserve MIA, and the position of the MIA map in the physical volume MIA are defined in each of the anchor descriptors.

The above-described data may be recorded in one MIB, or may require a plurality of MIBs. In the case where the data are recorded in a plurality of MIBs, a Map Entries field in the MIA map keeps track of how the MIBs are to be reproduced. When the data terminates in the middle of the last necessary MIB, "#00" is set for the byte next to the last required byte to the end byte of the MIB.

Next, a recording medium partition is described. A data storage region of a physical volume defined by partition information stored in volume structure descriptors 26 is called a "partition". One physical volume can be divided into a plurality of partitions. A number for specifying a partition in the physical volume is called a "partition number". The partition number is an integer that increases monotonically one-by-one from an initial value of zero. Physical sectors positioned within the same partition all have the same physical sector size.

Partitions are defined in a table of partition information that is stored in volume structure descriptor 26. The partition information defines the structure of the partition. This definition includes the physical sector number of the start of the partition and the number of physical sectors belonging to the partition. In the physical volume, one or more partitions are always defined. Partition numbers are assigned in the order in which the partition information defining each partition is recorded in the volume structure descriptor. The partition numbers of partitions defined in the first partition information and the second partition information are zero and one respectively. The partition number increases one-by-one for each consecutive partition, and the partition number for the n-th partition information is n−.

Next, the logical volume depicted in FIG. 3 will be described. The logical volume is a data storage region that is defined as a group of partitions and is stored as logical volume information in the volume structure descriptor of the physical volume. The logical volume region is formed by consecutively connecting partition regions from one or more physical volumes (that may or may not be physically consecutive) in accordance with a predetermined order as stored in a partition map of the logical volume information. The partition map designates each partition belonging to a logical volume. Each partition is identified by a volume identifier uniquely identifying the physical volume in which the partition is located, and a partition number in the physical volume indicating the location of the partition within the physical volume. The logical volume may consist of partitions belonging to different physical volumes, and one partition may belong to a plurality of logical volumes.

The logical volume is treated as a single region, irrespective of the actual physical border between partitions and physical sectors, and its contents are read or written in units of logical sectors. The logical sector number within a logical sector is an integer that increases monotonically one-by-one from an initial value of zero. In the case where the logical volume size is not an exact multiple of the sector size, an incomplete region generated in the physical sector that includes the end of the logical volume is not used, and is reserved for future extension. In the volume structure descriptor of each physical volume, a definition of information on partitions included in the physical volume and a definition of the logical volume are described. When a logical volume is associated with a plurality of physical volumes, logical volume information is always stored in the volume structure descriptor of each physical volume in which the partition having partition number 0 is defined. The volume structure descriptor is recorded in the MIA of each physical volume.

Next, the management and curing of defects in the physical volume will be described. For each partition, management of defects by using either a slipping procedure and/or a linear replacement procedure can be performed. Partition information in the volume structure descriptor determines whether defects exist, and the management of these defects is preformed for each partition. An alternate data region that is used in both the slipping and linear replacement procedure is called a "spare area". In a partition belonging to the same logical volume to which the partition for the management of defects belongs, one or more spare areas must always be reserved. When linear replacement is performed, the end of the partition region is also used as a spare area.

In the case where a slipping procedure to manage defects is performed, the start of a spare area reserved in the end of the partition is used as the spare area. When linear replacement is performed, and the alternate data region belongs to the same logical volume and is in a partition belonging to the same physical volume, a spare area excluding a spare area in the partition having a defect sector may be used. The defect management information on the slipping and linear replacement procedures is recorded as defect list information of the volume structure descriptor. Information on slipping is recorded in a primary defect list, and information on linear replacement is recorded in a secondary defect list.

In a media information descriptor, operating as a region in which information on media is recorded, zone-related information, and so forth, are recorded. In a drive information descriptor, information on a fixed drive (a device for recording or reproducing data on or from a medium) is recorded. In an extended data descriptor, physical volume information, partition information, and extension information that was not sufficiently recorded in a logical volume information header, are recorded.

Next, physical and logical volume data structures are described. These data structures define how information is stored in each of the required MIAs, MIBs, file system descriptors, volume structures descriptors, etc. for both physical and logical volumes.

Each anchor descriptor 20 (FIG. 2) has a size not more than the size of a physical sector, recorded in the format shown in Table 4.

TABLE 4

Anchor Descriptor

| BP | Length | Name | Contents |
|---|---|---|---|
| 0 | 8 | Signature | Signature |
| 8 | 4 | Start Physical Number of Main MIA | Unit 32 |
| 12 | 4 | Number of Physical Sectors in Main MIA | Unit 32 |
| 16 | 4 | Start Physical Sector Number of Reserve MIA | Unit 32 |
| 20 | 4 | Number of Physical Sector in Reserve MIA | Unit 32 |
| 24 | 2 | Number of MIBs for MIA Map in Main MIA $(=_{X1})$ | Unit 16 |
| 26 | 2 | Number of MIBs for MIA Map in Reserve MIA $(=_{X2})$ | Unit 16 |
| 28 | $2_{X1}$ | MIB Number of MIA Map for Main MIA in Main MIA | Unit 16 |
| $28 + 2_{X1}$ | $2_{X2}$ | MIB Number of MIA Map for Reserve MIA in Main MIA | Unit 16 |
| $28 + 2_{X1} + 2_{X1}$ $2_{X2}$ | | MIB Number of MIA Map for Main MIA in Reserve MIA | Unit 16 |
| $28 + 4_{X1} + 2_{X2}$ $2_{X2}$ | | MIB Number of MIA Map for Reserve MIA in Reserve MIA | Unit 16 |

In the data type field of the Signature (BP 0), 16 is set. The Start Physical Sector Number of Main MIA (BP 8) designates the physical sector number of the start physical sector of the main MIA. The Number of Physical Sector Number of Main MIA (BP 8) designates the number of physical sectors of the main MIA. The Start Physical Sector Number of Reserve (BP 16) designates the physical sector number of the start physical sector of the reserve MIA. The Number of Physical Sectors in Reserve MIA (BP 20) designates the number of physical sectors of the reserve MIA. The Number of MIBs for MIA Map in Main MIA (BP 24) designates the size (the number of MIBs) of the MIA map of the main MIA. The Number of MIBs for MIA Map in Reserve MIA (BP 26) designates the size (the number of MIBs) of the MIA map of the reserve MIA. The Number of MIA Map for Main MIA in main MIA (BP 28) designates the MIB in a Main MIA in which the MIA map for the main MIA is recorded. The MIB numbers of the MIBs constituting the MIA are sequentially set.

The MIB Numbers of MIA Map for Reserve MIA in Main MIA (BP 28+2(1)) designates an MIB in the main MIA in which the MIA map for the reserve MIA is recorded. The MIB numbers of the MIBs constituting the MIA map are sequentially set. The MIB Number of MIA Map for Main MIA in Reserve MIA (BP 28+2(1+2(2)) designates an MIB in the reserve MIA in which the MIA map for the main MIA is recorded. The MIB numbers of the MIBs constituting the MIA map are sequentially set. The MIB Number of MIA Map for Reserve MIA in Reserve MIA (BP 28+4(1+2(2))) designates an MIB in the reserve MIA in which the MIA map for the reserve MIA is recorded. The MIB numbers of the MIBs constituting the MIA map are sequentially set.

The MIA map is used to show the utilization of the MIBs. The MIA map shows the positions of MIBs used for recording of various types of data, MIBs that cannot be used due to defects, and MIBs that are not used as of yet. The MIA map is recorded in the format shown in Table 5.

TABLE 5

MIA Map

| BP | Length | Name | Contents |
| --- | --- | --- | --- |
| 0 | 8 | Signature | Signature |
| 8 | 2 | Location of MIA Map | Unit 16 |
| 10 | 2 | Location of Volume Structure Descriptor | Unit 16 |
| 12 | 2 | Location of Media Information Descriptor | Unit 16 |
| 14 | 2 | Location of Drive Information Descriptor | Unit 16 |
| 16 | 2 | Location of Extended Data Descriptor | Unit 16 |
| 18 | 2 | Number of Map Entries (=$_{X1}$) | Unit 16 |
| 20 | 2$_{X1}$ | Map Entries | Unit 16 |

In the data field type of the Signature (BP 0), 2 is set. The Location of MIA Map (BP 8) designates the MIB number of a start MIB in the MIA map. The Location of Volume Structure Descriptor (BP 10) designates the MIB number of the start MIB of a volume structure descriptor. The Location of Media Information Descriptor (BP 12) designates the MIB number of the start MIB of a media information descriptor. The Location of Drive Information descriptor (BP 14) designates the MIB number of the start MIB of a drive information descriptor.

The Location of Extended Data Descriptor (BP 16) designates the MIB number of the start MIB of the extended data descriptor. The Number of Map Entries (BP 18) designates the number of entries in the Map Entries beginning at BP 20. The number of entries is equal to the number of MIBs in the MIA, and is ""#FFF0"" or less. The Map Entries (BP 20) specifies the utilization of the MIBs. One map entry consists of Unit 16. The first map entry corresponds to the first MIB, the second map entry corresponds to the second MIB, and the n-th map entry corresponds to the n-th MIB. Table 6 is a table showing the values of the map entries.

TABLE 6

MIA Map Entry

| Value | Interpretation |
| --- | --- |
| #0000-#FFEF | Next MIB Number |
| #FFF0 | Unusable MIB |
| #FFF1 | Unused MIB |
| #FFF2-#FFFE | Reserved |
| #FFFF | Last MIB of the data structure |

FIG. 8 is an illustration of the structure of the volume structure descriptor, where "@APS" represents align-to-physical-sector, and its data represent alignment to a physical sector. In alignment, "#00" is set in a region defined from a byte next to an actual position at which proximate data is recorded. The various components of the volume structure descriptor will now be described.

A volume structure descriptor header is recorded in accordance with Table 7.

TABLE 7

Volume Structure Descriptor Header

| BP | Length | Name | Contents |
| --- | --- | --- | --- |
| 0 | 8 | Signature | Signature |
| 8 | 2 | Descriptor Size | Unit 16 |
| 10 | 2 | Reserved | #00 bytes |
| 12 | 4 | Offset to Physical Volume Information (=48) | Unit 32 |
| 16 | 4 | Offset to Partition Information (416) | Unit 32 |
| 20 | 4 | Offset to Spare Area Information | Unit 32 |
| 24 | 4 | Offset to Logical Volume Information | Unit 32 |
| 28 | 4 | Offset to Defect List Information | Unit 32 |

In the data type field of the Signature (BP 0), 17 is set. The descriptor size (BP 8) designates the size (the number of MIBs) of the volume structure descriptor. The Reserved (BP 10) is reserved for future extension, and "#00" is set in all the bytes. The Offset to Physical Volume Information (RBP 12) designates an offset (the number of bytes) from the start byte of the volume structure descriptor to the physical volume information, and 48 is set in it. The Offset to Partition Information (RBP 16) designates an offset (the number of bytes) from the start byte of the volume structure descriptor to the partition information, and 416 is set in it. The Offset to Spare Area Information (RBP 20) designates an offset (the number of bytes) from the start byte of the volume structure descriptor to the spare area information. The Offset to Logical Volume Information (RBP 24) designates an offset (the number of bytes) from the start byte of the volume structure descriptor to the logical volume information. The Offset to Defect List Information (RBP 28) designates an offset (the number of bytes) from the start byte of the volume structure descriptor to the defect list information.

The physical volume information must be recorded in accordance with Table 8.

TABLE 8

Physical Volume Information

| BP | Length | Name | Contents |
| --- | --- | --- | --- |
| 0 | 2 | Character Set | Character Set |
| 2 | 2 | Physical Volume Name Size | Unit 16 |

TABLE 8-continued

Physical Volume Information

| BP | Length | Name | Contents |
| --- | --- | --- | --- |
| 4 | 256 | Physical Volume Name | bytes |
| 260 | 20 | Physical Volume Identifier | bytes |
| 280 | 6 | Creation Time | Time Stamp |
| 286 | 6 | Modification Time | Time Stamp |
| 292 | 2 | Number of Partitions (=Np) | Unit 16 |
| 294 | 2 | Number of Spare Areas (=Ns) | Unit 16 |
| 296 | 2 | Number of Partitions with Defect Management (Ndump) | Unit 16 |
| 298 | 2 | Number of Logical Volume (=Nv) | Unit 16 |
| 300 | 2 | Reserved | #00 bytes |
| 302 | 2 | Extended Data Identifier | Unit 16 bytes |
| 304 | 64 | Extended Data | bytes |

The Character Set (RBP 0) designates the character codes of a physical volume name recorded in a physical name field. The Physical Volume Name Size (RBP 2) designates the size (the number of bytes) of the physical volume name recorded in the physical name field. The Physical Volume Name (RBP 4) designates the physical volume name. The Physical Volume Identifier (RBP 260) designates a byte string for defining a unique physical volume identity. The Creation Time (RBP 280) designates the time and date of the first definition of the physical volume structure. The Modification Time (RBP 286) designates the last time and date that the physical volume structure has been changed. The Number of Partitions (RBP 292) designates the number of partitions included in the physical volume, and coincides with the number of pieces of partition information.

The Number of Spare Areas (RBP 294) designates the number of spare areas included in the physical volume, and coincides with the number of pieces of spare area information. The Number of Partitions with Defect Management (RBP 296) designates the number of partitions that have had defect management performed thereon among partitions included in the physical volume, and coincides with the number of defects lists. The Number of Logical Volumes (RBP 298) designates the number of logical volumes to which the partitions included in the physical volume belong, and coincides with the number of pieces of logical volume information. The Reversed (RBP 300) is reserved for future extension, and "#00" is set in all the bytes. The Extended Data Identifier (RBP 302) designates an ID for specifying extended data recorded in an extended data field or an extended data area. The Extended Data (RBP 304) is reserved for future extension, and "#00" is set in all the bytes.

The partition information must be recorded in the format shown in Table 9.

TABLE 9

Partition Information

| BP | Length | Name | Contents |
| --- | --- | --- | --- |
| 0 | 4 | Start Physical Sector Number | Unit 32 |
| 4 | 4 | Number of Physical Sectors | Unit 32 |
| 8 | 4 | Number of Usable Sectors | Unit 32 |
| 12 | 4 | Physical Sector size (=PSS) | Unit 32 |
| 16 | 1 | Access Type | Unit 8 |
| 17 | 1 | Usage Information | Unit 8 |
| 18 | 2 | Reserved | #00 bytes |
| 20 | 4 | Location of Primary Defect List | Disk Extent |
| 24 | 4 | Location of Secondary Defect List | Disk Extent |
| 28 | 2 | Reserved | #00 bytes |
| 30 | 2 | Extended Data Identifier | Unit 16 |
| 32 | 64 | Extended Data | #00 bytes |

The start Physical Sector Number (RBP 0) designates the physical sector number of the start physical sector of a region constituting a partition. The Number of Physical Sectors (RBP 4) designates the number of physical sectors constituting the partition. The Number of Usable Sectors (RBP 8) designates a total number of usable physical sectors among regions constituting the partition, and coincides with the number of physical sectors of regions in which a spare area included in the partition is subtracted from all the regions of partitions. The Physical Sector Size (RBP 12) designates the size (the number of bytes) of the physical sectors constituting the partition. The Access Type (RBP 16) designates the state of recording characteristics of the partition. Table 10 is a table showing the possible contents of the Access Type.

TABLE 10

Access Type

| Value | Name | Interpretation |
| --- | --- | --- |
| 0 | Read Only | The user may not write any data in this partition |
| 1 | Write Once | The user can write data but once in this partition |
| 2 | Rewritable | The user can write data many times in this partition |
| 3–15 | Reserves | Reserved for future use |

Referring back to Table 9, the Usage Information (RBP 17) designates the ability of a user to use various portions of the partition. Table 11 is a table showing the contents of usage information.

TABLE 11

Usage Information

| Bit | Interpretation |
| --- | --- |
| 0 | Used (1: used, 0: not used) |
| 1 | Defect management: Slipping (1: on, 0: off) |
| 2 | Defect Management: Linear replacement (1: on, 0: off) |
| 3–7 | Reserved |

Once again, referring back to Table 9, the Reserved (RBP 18) is reserved for future extension, and "#00" is set in all the bytes. The location of the Primary Defect List (RBP 20) stores information on the recording position of the primary defect list when slipping is used to perform defect management in this partition, and sets "#00" in all the bytes when defect management using slipping is not performed. The Location of Secondary Defect List (RBP 24) stores information on the recording position of a secondary defect list when defect management using linear replacement is performed in this partition, and sets "#00" in all the bytes when defect management using linear replacement is not performed. The Reserved (RBP 28) is reserved for future extension, and "#00" is set in all the bytes. The Extended Data Identifier (RBP 30) designates an ID for specifying extended data recorded in the extended data field or the extended data area. The Extended Data (RBP 32) is reserved for future extension, and "#00" is set in all the bytes.

Spare area information is recorded in the format shown in Table 12.

TABLE 12

Spare Area Information

| BP | Length | Name | Contents |
|---|---|---|---|
| 0 | 4 | Start Physical Sector Number | Unit 16 |
| 4 | 4 | Number of Physical Sectors | Unit 16 |
| 8 | 8 | Reserved | #00 bytes |

The Start Physical Sector Number (RBP 0) designates the physical sector number of the start physical sector in the spare area. The Number of Physical Sectors (RBP 4) designates the number of physical sectors constituting the spare. The Reserved (RBP 8) is reserved for future extension, and "#00" is set in all the bytes.

Each logical volume is similarly provided with various recorded data structures. The logical volume information header is recorded in the format shown in Table 13.

TABLE 13

Logical Volume Information Header

| RBP | Length | Name | Contents |
|---|---|---|---|
| 0 | 2 | Character Set | Character Set |
| 2 | 2 | Logical Volume Name Size | Unit 16 |
| 4 | 256 | Logical Volume Name | bytes |
| 260 | 2 | Boot Indicator | Unit 16 |
| 262 | 2 | File System Indicator | Unit 16 |
| 264 | 2 | Logical Sector Size | Unit 16 |
| 266 | 2 | Number of Partitions (=Npv) | Unit 16 |
| 268 | 4 | Reserved | #00 bytes |
| 272 | 16 | Logical Volume Contents Use | bytes |
| 288 | 14 | Reserved | #00 bytes |
| 302 | 2 | Extended Data Identifier | Unit 16 |
| 304 | 64 | Extended Data | #00 bytes |

The Character Set (RBP 0) designates the character codes of a logical volume name recorded in a logical volume name field. The Logical Volume Name Size (RBP 2) designates the size (the number of bytes) of a logical volume name designated in the logical volume name field. The Logical Volume Name (RBP 4) designates the logical volume name. The Boot Indicator (RBP 260) designates information on activation from the logical volume. The contents of the Boot Indicator are shown in Table 14. A physical volume must not have two or more logical volumes in which a boot indicator is active and its start partition is in the physical volume.

TABLE 14

Boot Indicator

| Value | Name | Contents |
|---|---|---|
| 00h | Not Active | Physical volume is not set that computer boots up from this logical volume |
| 80h | Active | Physical volume is set that computer boots up from this logical volume |

Referring back to Table 13, the File System Indicator (RBP 262) designates the file system used in this logical volume. The possible contents of the File System Indicator are shown in Table 15.

TABLE 15

File System Indicator

| Value | Name | Contents |
|---|---|---|
| 00h | Unknown | This logical volume is unknown. |
| 01h | 12 bit FAT | This logical volume is formatted with 12 bit FAT. |
| 04h | 16 bit FAT | This logical volume is formatted with 16 bit FAT. |
| 05h | 16 bit FAT, Extended | This logical volume is formatted with 16 bit FAT, and defined an extended partition. |
| 06h | 16 bit FAT, Extended, 64KB/claster | This logical volume is formatted with 16 bit FAT, and defined an extended partition, using 64KB/claster. |
| 07h | HPFS | This logical volume is formatted with HPFS |
| 08h | 32 bit FAT | This logical volume is formatted with 32 bit FAT. |
| F0h | KIFS | This logical volume is formatted with KIFS. |

Once again, referring back to Table 13, the Logical Sector Size (RBP 264) designates the size (the number of bytes) of logical sectors of the logical volume. The Number of Partitions (RBP 266) designates the number of partitions constituting the logical volume, and coincides with the number of partition maps. The Reserved (RBP 268) is reserved for future extension, and "#00" is set in all the bytes. The Logical Volume Contents Use (RBP 272) is a region that can be freely used by the file system used in the logical volume. The Extended Data Identifier (RBP 302) designates an ID for specifying extended data recorded in an extended data field or an extended data area. The Extended Data (RBP 304) is reserved for future extension, and "#00" is set in all the bytes.

Each partition map for each logical volume is recorded in the format shown in FIG. 16.

TABLE 16

Partition Map

| BP | Length | Name | Contents |
|---|---|---|---|
| 0 | 20 | Volume Identifier Name | bytes Contents |
| 20 | 2 | Partition Number | Unit 16 |
| 22 | 2 | Reserved | #00 bytes |

The Volume Identifier (RBP 0) designates a physical volume identifier recorded in physical volume information of the physical volume to which partitions constituting the logical volume belong. The Partition Number (RBP 20) designates a partition number constituting the logical volume. The Reserved (RBP 22) is reserved for future extension, and "#00" is set in all the bytes.

A defect list information header for each logical volume is recorded in the format shown in Table 17.

TABLE 17

Defect List Information Header

| BP | Length | Name | Contents |
|---|---|---|---|
| 0 | 2 | Number of MIBs for Primary Defect List | Unit 16 |
| 8 | 2 | Number of MIBs for Secondary Defect List | Unit 16 |
| 4 | 12 | Reserved | #00 bytes |

The Number of MIBs for Primary Defect List (RBP 0) designates the number of MIBs used for recording the primary defect list. The Number of MIBs for Secondary Defect List (RBP 2) designates the number of MIBs used for recording the secondary defect list. The Reserved (RBP 4) is reserved for future extension, and "#00" is set in all the bytes.

The primary defect list/secondary defect list is recorded in the format shown in Table 18.

TABLE 18

Primary Defect List/Secondary Defect List

| BP | Length | Name | Contents |
|---|---|---|---|
| 0 | 8 | Signature | Signature |
| 8 | 2 | Partition Number | Unit 16 |
| 10 | 2 | Number of Entries (=Npd) | Unit 16 |
| 12 | 4 | Reserved | #00 bytes |
| 16 | 4(8)Npd | Defect List Entry | bytes |

In the data type field of the Signature (BP 0), 18 is set for the primary defect list, and 19 is set for the secondary defect list. The Partition Number (BP 8) designates the partition number of the partition the defect list is associated with. The Number of Entries (BP 10) designates the number of entries in the Defect List Entry. The Reserved (RBP 12) is reserved for future extension, and "#00" is set in all the bytes. The Defect List Entry (RBP 16) records primary defect list entries for the primary defect list, and records secondary defect list entries for the secondary defect list. In both cases, the defect list entry is recorded in ascending order in accordance with values in each Physical Sector Number of Defect Sector field.

The structure of a media information descriptor is shown in FIG. 9. The components thereof will now be described.

A media information descriptor header providing physical information about the recording medium is recorded in the format shown in Table 19.

TABLE 19

Media information Descriptor Header

| BP | Length | Name | Contents |
|---|---|---|---|
| 0 | 8 | Signature | Signature |
| 8 | 2 | Descriptor Size | Unit 16 |
| 10 | 6 | Reserved | #00 bytes |
| 16 | 2 | Number of Disks | Unit 16 |
| 18 | 2 | Number of Sides per Disks | Unit 16 |
| 20 | 2 | Number of Layers per Side | Unit 16 |
| 22 | 2 | Number of Zones per Layer (=Nz) | Unit 16 |
| 24 | 8 | Reserved | #00 bytes |
| 32 | 2 | Number of Cylinders | Unit 16 |
| 34 | 2 | Number of Heads (tracks per cylinder) | Unit 16 |
| 36 | 2 | Number of Sectors per Tracks | Unit 16 |
| 38 | 10 | Reserved | #00 bytes |

The data type field of the Signature (BP 0), 20 is set. The Descriptor Size (BP 8) designates the size (the number of MIBs) of the media information descriptor. The Reserved (BP 10) is reserved for future extension, "#00" is set in all the bytes. The Number of Disks (BP 16) designates the number of disks. The Number of Sides per Disk (BP 18) designates the number of sides per disk. The Number of Layers per Disk (BP 20) designates the number of layers per side. The Number of Zones per Layer (BP 22) designates the number of zones per layer. The Reserved (BP 24) is reserved for future extension, and "#00" is set in all the bytes. The Number of Cylinders (BP 32) designates the number of cylinders. The Number of Heads (tracks per cylinder) (BP 34) designates the number of heads (the number of tracks per cylinder). The Number of Sectors per track (BP 36) designates the number of sectors per track. The reserved (BP 38) is reserved for future extension, and "#00" is set in all the bytes.

Zone information is recorded in the format shown in Table 20.

TABLE 20

Zone Information

| BP | Length | Name | Contents |
|---|---|---|---|
| 0 | 4 | Start Physical Sector Number | Unit 16 |
| 4 | 4 | Number of Physical Sector | Unit 16 |
| 8 | 8 | Reserved | #00 bytes |

The Start Physical Sector Number (RBP 0) designates the physical sector number of the start physical sector of a zone. The Number of Physical Sector (RBP 4) designates the number of physical sectors constituting the zone. The Reserved (RBP 8) is reserved for future extension, "#00" is set in all the bytes.

The structure of the drive information descriptor is shown in FIG. 10. A drive information descriptor head thereof is recorded in the format shown in Table 21.

TABLE 21

Drive Information Descriptor Header

| BP | Length | Name | Contents |
|---|---|---|---|
| 0 | 8 | Signature | Signature |
| 8 | 2 | Descriptor | Unit 16 |
| 10 | 1 | Strategy Type | Unit 8 |
| 11 | 5 | Reserved | #00 bytes |

In the data type field of the Signature (BP 0), 21 is set. The Descriptor Size (BP 8) designates the size (the number of MIBs) of the drive information descriptor. The Strategy Type (BP 10) designates a strategy type (as will be described below). The Reserved (BP 11) is reserved for future extension, and "#00" is set in all the bytes.

The structure of the extended data descriptor is shown in FIG. 11, where "@APS" represents align-to-physical-sector, and shows that the data must be aligned to the physical sector. In a region from a byte next to proximate data to the sector end, "#00" is set. The components of the extended data descriptor will now be described.

An extended data descriptor header is recorded in the format shown in Table 22.

TABLE 22

Extended Descriptor Header

| BP | Length | Name | Contents |
|---|---|---|---|
| 0 | 8 | Signature | Signature |
| 8 | 2 | Descriptor Size | Unit 16 |
| 10 | 6 | Reserved | #00 bytes |
| 16 | 2 | Location of Extended Data for Physical Volume | Disk Extent |
| 20 | 4Np | Location of Extended Data for Partition | Disk Extent |
| 20 + 4Np | 4Nv | Location of Extended Data for Logical Volume | Disk Extent |

In the data type field of the Signature (BP 0), 22 is set. The Descriptor Size (BP 8) sets the size (the number of MIBs) of an extended data descriptor. The Reserved (BP 10) is reserved for future extension, "#00" is set in all the bytes. The Location of Extended Data for Physical Volume (BP 16) designates a location in which extended data on this physical volume are recorded. The location of Extended Data for Partitions (BP 20) designates a location in which extended data for each partition are recorded. The Location of Extended Data for Logical Volume (BP 20+4Np) designates a location in which extended data for each logical volume are recorded.

Next levels of medium interchange, which allows for the exchange of information between recording medium, are described. For level 0 of medium interchange, the following limitations are provided. A logical volume must consist only of partitions belonging to the same physical volume. In the case where a plurality of partitions are defined in the same physical volume, the regions of the partitions must not overlap with one another. The physical sectors of the partitions constituting the logical volume must have the same physical sector size. A logical sector size must be a multiple of a physical sector size, or the physical sector size must be a multiple of the logical sector size. The size of the partition must be a greater multiple of the logical sector size or physical sector size. A partition for defect management must always preserves one or more spare areas. Defect management by linear replacement must use the spare areas preserved in the partition as an alternate data region.

Level 1 of medium interchange has no limitations.

Next, an example of the structure of a physical volume is described. Table 23 shows the volume structure of a hybrid disk based on FAT for VDR, ISO 9660 (with Joliet), ISO/IEC 13346, or KIFS. In Table 23, the symbol "♦" represents fixed position information that cannot be relocated. Table 23 depicts the positioning of each of the elements discussed above in a predefined structure.

TABLE 23

Example of Volume Structure (FAT, 9660, 13346, KIFS Hybrid)

| PSN (bax) | Descriptor | Contents |
|---|---|---|
| 0 | [FAT] Partition Table | ♦ [FAT] Partition Table |
| C | [KIFS] Anchor Descriptor | ♦ [KIFS] Anchor |
| 10 | [9660] Primary Volume Descriptor | ♦ [9660/13346/KIFS] Volume Recognition Sequence |
| 11 | [9660] Primary Volume Descriptor (Reserve) | |
| 12 | [9660] Supplementary Volume Descriptor (for Joliet) | |
| 13 | [9660] Volume Descriptor Set Terminator | |
| 14 | [13346] Beginning Extended Area Descriptor | |
| 15 | [13346] NSR Descriptor | |
| 16 | [13346] Terminating Extended Area Descriptor | |
| 17 | [13346] Beginning Extended Area Descriptor | |
| 18 | [KIFS] KIFS Descriptor | |
| 19 | [13346] Terminating Extended Area Descriptor | |
| 30 | [13346] Primary Volume Descriptor | [13346] Main Volume Descriptor SequenceExtent |
| 31 | [13346] Implementation Use Volume Descriptor | |
| 32 | [13346] Partition Descriptor | |
| 33 | [13346] Logical Volume Descriptor | |
| 34 | [13346] Unallocated Space Descriptor | |
| 35 | [13346] Terminating Descriptor | |
| 40 | [13346] Primary Volume Descriptor | [13346] Reserve Volume Descriptor Sequence Extent |
| 41 | [13346] Implementation Use Volume Descriptor | |
| 42 | [13346] Parting Descriptor | |
| 43 | [13346] Logical Volume Descriptor | |
| 44 | [13346] Unallocated Space Descriptor | |
| 80 | [KIFS] MIA for MIA | [KIFS] Main MIA |
| 81 | [KIFS] MIA for Map Reserved MIA | |
| 82 | [KIFS] Volume Structure Descriptor | |
| 83 | [KIFS] Primary Defect List | |
| 84 | [KIFS] Secondary Defect List | |
| 85 | [KIFS] Media Information Descriptor | |
| 86 | [KIFS] Drive Information Descriptor | |
| 87 | [KIFS] Extended Data Descriptor | |
| 88 | [KIFS] Extended Data | |
| c0 | [KIFS] MIA Map for Reserve Data | [KIFS] Reserve MIA |
| c1 | [KIFS] MIA Map for Main MIA | |
| c2 | [KIFS] Volume Structure Descriptor | |
| c3 | [KIFS] Primary Defect List | |
| c4 | [KIFS] Secondary Defect List | |
| c5 | [KIFS] Defect Sector | |
| c6 | [KIFS] Media Information Descriptor | |
| c7 | [KIFS] Drive Information Descriptor | |
| c8 | [KIFS] Extended Data Descriptor | |
| c9 | [KIFS] Extended Data | |
| 100 | [13346] Anchor Volume Descriptor Pointer | ♦ [13346] Anchor |
| 150 | [KIFS] LOGICAL VOLUME | |

TABLE 23-continued

Example of Volume Structure (FAT, 9660, 13346, KIFS Hybrid)

| PSN (bax) | Descriptor | Contents |
|---|---|---|
| LPSN-150 | — | |
| LPSN-100 | [13346] Anchor Volume Descriptor Pointer | ◆ [13346] Anchor |
| LPSN-20 | [KIFS] Anchor Descriptor | ◆ [KIFS] Anchor |
| LPSN-c | [KIFS] Anchor Descriptor | ◆ [KIFS] Anchor |

Next, an AV file system used in accordance with a logical volume will be described. Logical sector numbers are assigned consecutive numbers for identifying the logical sectors. The logical volume is a group of equal-sized logical sectors having logical sector numbers beginning from zero in the sequential ascending order.

The management information area (MIA) for file system management in each logical volume is composed of a plurality of successive logical sectors in the logical volume, and is used for storing various types of control information regarding the AV file system. Each sector in the MIA is a management information block (MIB). Management information block (MIB) numbers each have a value obtained by subtracting, from the logical sector number of the management formation block, the logical sector number of the start management information block of the MIA. Thus, the MIB number is a number indicating an offset from the beginning of the MIA.

The AV File System Descriptor (32 in FIG. 3, and described below in further detail) is recorded in one logical sector, and designates the positions and sizes of a main MIA and a reserve MIA in the logical volume, as well as the positions of MIA maps in the main MIA and the reserve MIA. The position of the AV file system descriptor is set in the Logical Volume Content Use (BP 284) as shown in Table 24.

TABLE 24

Logical Volume Contents Use field

| RBP | Length | Name | Contents |
|---|---|---|---|
| 0 | 4 | Main AV File System Descriptor Location | Unit 32 |
| 4 | 4 | Reserve AV File System Descriptor Location | Unit 32 |
| 8 | 8 | Reserved | #00 bytes |

The Main AV File System Descriptor Location (RBP 0) designates the logical sector number of the AV file system descriptor. The Reserve AV File System Descriptor Location (RBP 4) designates the logical sector number of an AV file system descriptor at a location different from the designation of the Main AV File System Descriptor Location. If there is only one AV file system descriptor in the logical volume, "#FFFFFFFF" is set in the Reserve AV File System Descriptor Location. The Reserved (RBP 8) is reserved for future extension, and "#00" is set in it.

Various types of management information for use by the AV file system of the invention are recorded in the management information area (MIA) of the logical volume. For maintaining reliability, two identical MIAs are recorded in the logical volume, and are called the "main MIA" and the "reserve MIA", respectively. The positions and sizes of the main MIA and the reserve MIA, and the positions of MIA maps in the MIAs are defined in the AV file system descriptor 32. Logical sectors in each MIA are called "management information blocks (MIBs)", and offsets from the start MIB of the MIA of the logical sector number are called "MIB numbers".

Each MIB number is used to designate a particular MIB. Each MIA includes MIBs that cannot be used due to a defect or the like, MIBs that are not currently used, and MIBs that are currently used for storing the data structures, including an MIA map, a file table, an allocation extent table, an allocation strategy table, a defect information table, and an extended attribute table. The subjects of the MIBs in the MIA are recorded in the MIA map. Each of the data structures are recorded in one MIB or a plurality of MIBs. In the case where the data structures are recorded in a plurality of MIBs, these MIBs are logically connected, and the order of connecting the MIBs are recorded in the map entry field of the MIA map. In the case where each data structure ends in the middle of an MIB, "#00" is stored from in the byte next to the data end through to the next MIB.

In the AV file system, files and directories are managed by a file table (described below). The structure of the file table is determined by a File Table Structure Type, and is stored as a parameter in the file table. In a File Table Structure Type 0, in accordance with the invention, the file table consists of a file table and one or more file records. Each file record is a data region having a fixed length, and includes a field for identifying the file record, a field representing the type of the file record, a field representing the data and time of creation and correction of the file record, a field representing properties of the file record, a field designating a parent file record called a "parent link", a field designating a twin file record called a "next link", a field designating a child file record called a "child link", and a field designating an extended attribute record chain. The file records are numbered using numbers called "file record numbers", and the parent link, the next link, and the child link are designated by their respective file record numbers.

Figure 12:
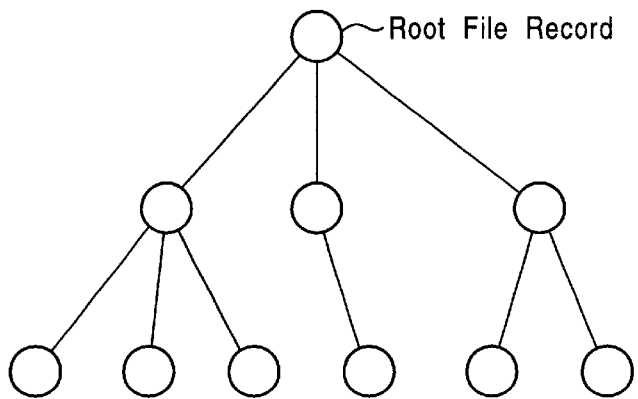
FIG. 12 depicts a file system used in accordance with the disk recording medium of FIG. 1.
Figure 13:
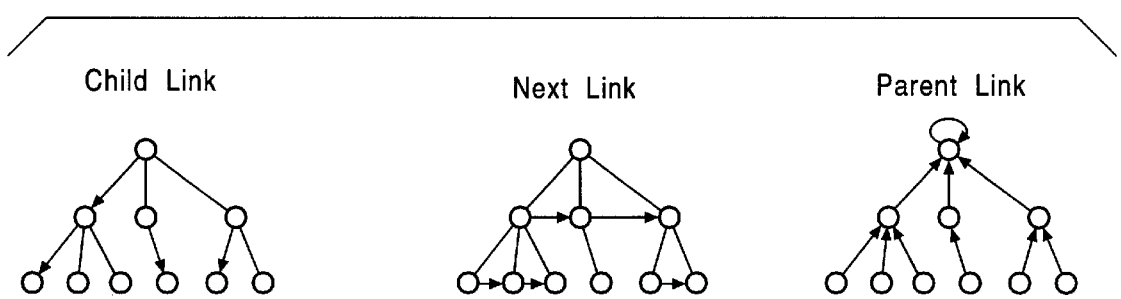
FIG. 13 depicts a child link, a next link, and parent link of the file system of FIG. 12.

In File Table Structure Type 0, a tree structure as shown in FIG. 12 is formed in which the first file record of the file table is used as a root of the tree structure. In FIG. 12, each circle indicates one file record, and the root file record is called the "root file record". A file record having no data to be referred to is called a "directory", while a file record having data is called a "file". Both a directory and a file can have a child file record. This hierarchical structure is realized by setting the child link, the next link, and the parent link, as will now be described.

A list of file records composed of next links is called a "file record chain". This list comprises file records having unique ID and file types. A sub-file is a type of file, and indicates a part of data from a file to be referred to by a parent file record as if the part of data was another, independent file. A file record in which 10 is set in the data location type of the attribute field represents a sub-file.

In the AV file system of the invention, data management is executed using continuous allocation extent regions (in a logical volume) as a unit. The allocation extent starts at an arbitrary offset in a logical sector and ends at an arbitrary offset in the logical sector, or the allocation extent includes zero or more consecutive logical sectors and ends at an arbitrary byte offset in the last logical sector. The start point, end point, properties, etc., of an allocation extent are recorded in an allocation extent record in the allocation extent table, as described above.

In the allocation extent table, allocation extent records corresponding to all the allocation extents of a logical volume are registered. Each allocation extent record has a field designating the next allocation extent record, and by using this field, a list of a plurality of linked allocation extent records can be created. This list is called an "allocation extent record chain". Normally, file data are treated as a single set, with an allocation extent record chain defining all of the allocation extents in which this file data is stored.

A list made of allocation extent records that are not used in the allocation extent table (records having allocation extent record status 00) is called a "free allocation extent record chain", and this free allocation extent record chain is easily traced. Also, a list created by collecting allocation extent records that include a defect sector in the corresponding allocation extent (records having allocation extent record status 10), which makes it impossible to reuse the allocation extent records, is called a "defective allocation extent record chain", and this list can be easily traced from the allocation extent table.

The position and size of an allocation extent in the logical volume is determined by an allocation strategy. An allocation strategy table registers a plurality of allocation strategies, and can use a different allocation strategy for each file to allocate an allocation extent in the logical volume. The range of a region managed by each allocation strategy, or parameters used by each allocation strategy is an allocation strategy record in the allocation strategy table. In File Table Structure Type 0, in accordance with the invention, an allocation strategy is determined for each file record, and the allocation strategy is recorded in the data location field of the file record. The data location field is referred to when the allocation extent is operated upon, and the corresponding allocation strategy is called.

Two allocation strategy types, Allocation Strategy Type 0 and Allocation Strategy Type 1, are lined in accordance with the invention, by way of example. Allocation Strategy Type 0 is a method adapted for non-sequentially treating relatively-small-sized files such as index data or computer data, and Allocation Strategy Type 1 is a method adapted for sequentially reading or writing data for MPEG, etc. that is typically more continuous, and includes longer files.

A defect information table is a table in which the logical sector numbers of defective sectors in the logical volume are recorded, and can be used for the management of the defective sectors. An extended attribute table can be used to maintain the extension properties of a file or directory in the MIA. The extended attribute table includes an extended attribute table header, and one or more extended attribute table records. The extended attribute records are fixed-length records having a field for a link, and can create an extended attribute record chain using a list of a plurality of extended attribute records.

The data structure used by the AV Systems will now be described. In the head of the data structure used by the AV system file, the Signature is set. The Signature is recorded as shown in Table 25.

TABLE 25

Signature

| RBP | Length | Name | Contents |
|---|---|---|---|
| 0 | 4 | Identification | Bytes = "AVFS" |
| 4 | 1 | Version | Unit 8 = 1 |
| 5 | 1 | Data type | Unit 8 |
| 6 | 2 | Reserved | #00 bytes |

In the Identification (RBP 0), character string "AVFS" is set in accordance with ISO/IEC 646. The Version (RBP 4) designates a version number, and 1 is set in it. The Data Type (RBP 5) designates the type of a data structure. The possible values shown in Table 26 are set for the data type depending on the type of the data structure.

TABLE 26

Data type

| Value | Interpretation |
|---|---|
| 0 | Reserved |
| 1 | AV File System Descriptor |
| 2 | MIA Map |
| 3 | File Table |
| 4 | Allocation Extents Table |
| 5 | Allocation Strategy Table |
| 6 | Defect Information Table |
| 7 | Extended Attribute Table |
| 8–255 | Reserved |

Referring back to Table 25, the Reserved (RBP 6) is reserved for extensions, and "#00" is set in it. The Signature is used to identify a data structure when crash recovery is performed.

The AV File system Descriptor data type of Table 26 is recorded as shown in Table 27.

TABLE 27

AV File System Descriptor

| BP | Length | Name | Contents |
|---|---|---|---|
| 0 | 8 | Signature | Signature |
| 8 | 4 | Location of Main MIA | Unit 32 |
| 12 | 4 | Location of Reserve MIA | Unit 32 |
| 16 | 2 | Length of Main MIA | Unit 16 |
| 18 | 2 | Length of Reserve MIA | Unit 16 |
| 20 | 4 | Creation Time | Time Stamp |
| 24 | 4 | Modification Time | Time Stamp |
| 28 | 2 | Number of MIA Map Sectors in Main MIA ($=x_1$) | Unit 16 |
| 30 | 2 | Number of MIA Map Sectors in Reserve MIA ($=x_2$) | Unit 16 |
| 32 | $2x_1$ | MIA Map Sectors in Main MIA | Bytes |
| 32 + 2$x_1$ | $2x_1$ | MIA Map Sectors in Reserve MIA | Bytes |
| $x_1$ | | MIA | |

In the data type field of the Signature, 1 is set. The Location of Main MIA (BP 8) designates a start logical sector number in the main MIA. The location of Reserve MIA (BP 12) designates a start logical sector number in the reserve MIA. The Length of Main MIA (BP 16) uses the number of logical sectors of the main MIA to designate the size of the main MIA. The Length of Reserve MIA (BP 18) uses the number of logical sectors of the reserve MIA to designate the size of the reserve MIA. The Creation Time (BP 20) stores the data and time of creation of the AV File System Descriptor. The Modification Time (BP 24) designates the date and time of the updating of the AV File System Descriptor. The Number of MIA Map Sectors in Main MIA (BP 28) designates the number of MIB numbers described in the Main MIA Map Sectors (BP 32).

The Number of MIA Map Sectors in Reserve MIA (BP 30) designates the number of MIB numbers described in the Reserve MIA Map Sectors (BP 32+2(1). The MIA Map Sectors in Main MIA (BP 32) designates MIBs constituting the MIA map in the main MIA, and sequentially sets the MIB numbers of the MIB that constitute the MIA map. The MIA Map Sectors in Reserve MIA (BP 32+2(1) designates MIBs constituting the MIA map in the reserve MIA, and sequentially sets MIB numbers of the MIB that constitute the MIA map.

Referring back to Table 26, the MIA map is used to indicate the utilization of the MIBs in the MIA. The MIA map indicates various types of data structure in the MIA, MIBs that cannot be used due to a defect or the like, and the positions of MIBs that are not used. The MIA map is recorded as shown in Table 28.

TABLE 28

MIA Map

| BP | Length | Name | Contents |
|---|---|---|---|
| 0 | 8 | Signature | Signature |
| 8 | 2 | Location of Main MIA | Unit 16 |
| 10 | 2 | Location of Allocation Strategy Table | Unit 16 |
| 12 | 2 | Location of File Table | Unit 16 |
| 14 | 2 | Location of Allocation Extents Table | Unit 16 |
| 16 | 4 | Location of Defect List Table | Unit 16 |
| 18 | 2 | Location of Extended Attribute Descriptor | Unit 16 |
| 20 | 2 | Reserved | Bytes |
| 22 | 2 | Number of Map Entries (=$x_1$) | Unit 16 |
| 24 | $2x_1$ | Map Entries | Bytes |

In the data type field of the Signature (BP 0), 2 is set. The Location of MIA Map (BP 8) designates the MIB number of the start MIB of the MIA map in the MIA. The Location of Allocation Strategy Table (BP 10) designates the MIB number of the start MIB of an allocation strategy table in the MIA. The Location of File Table (BP 12) designates the MIB number of the start MIB of a file table in the MIA.

The location of Allocation Extents Table (BP 14) designates the MIB number of the start MIB of an allocation extent table in the MIA. The Location of Defect List Table (BP 16) designates the MIB number of the start MIB of a defect list table in the MIA. If the MIA has no defect list table, "#FFFF" is set in the Location of Defect List Table. The Location of Extended Attribute Descriptor (BP 18) designates the MIB number of the start MIA of an extended attribute descriptor in the MIA. If the MIA has no extended attribute descriptor, "#FFFF" is set in the Location of Extended Attribute Descriptor. The Reserved (BP 20) is reserved for extensions, "00" is set in it.

The number of Map Entries (BP 22) designates the number of map entries starting at BP 24. This number is equal to the number of MIBs in the MIA, and is not more than "#FFF0". The Map Entries (BP 24) designates the utilizing condition of the MIBs in the MIA. One map entry consists of Unit 16. The first map entry corresponds to the first MIB of an MIA, and the second map entry corresponds to the second MIB of the MIA.

The possible values of the map entries of Table 28 have the meanings shown in Table 29.

TABLE 29

Map Entry Value

| Value | Interpretation |
|---|---|
| #0000-#FFEF | Next MIB Number |
| #FFF0 | Unusable MIB |
| #FFF1 | Unused MIB |
| #FFF2-#FFFE | Reserved |
| #FFFF | Last MIB of the data structure |

If a data structure is equal to or smaller than a logical sector size, and is stored in one MIB, "#FFFF" is set in a map entry corresponding to the MIB. In the case where a data structure is recorded in a plurality of MIBs, the MIB number of the next MIB is set in map entries for each MIB other than the end map entry, and "#FFFF" is set in a map entry of the end MIB. An MIB having a map entry value of "#FFFF" indicates that the block is not used, and it can be used when the data structure needs a new MIB. An MIB having a map entry value of "#FFF0" indicates that a problem (defective sector, etc.) occurs when the block is used.

The file table of Table 26 consists of a file table header and file table data as shown in FIG. 14. The structure of the file table data is determined by the file table structure type field of the file table header, both of which will now be described.

The file table header is recorded as shown in Table 30.

TABLE 30

File Table Header

| BP | Length | Name | Contents |
|---|---|---|---|
| 0 | 8 | Signature | Signature |
| 8 | 4 | Length of File Table Data | Unit 32 |
| 12 | 2 | File Table Structure Type | Unit 16 |
| 14 | 18 | File Table Structure Type dependent information | Bytes |

In data type field of the Signature (BP 0), 3 is set. The Length of File Table Data (BP 8) uses the number of bytes to designate the length of file table data. The File Table Structure Type (BP 12) defines the structure of the file table data. In the File Table Structure Type Dependent Information (BP 14), predetermined information for each file table structure type is set.

In the case where the File Table Structure Type is zero, the file table includes a file table header and one or more file records as shown in FIG. 15. The file records are numbered in sequential ascending order from zero, and the numbers are called "file record numbers". A list of file records is created by setting the file record number of the next record in the Next Link field. This list is called d a "file record chain". All file records in the file table that are not used create a file record chain called "free file record chain".

In the case where the File Table Structure Type is zero, the file table header is recorded as shown in Table 31.

TABLE 31

File Table Header

| BP | Length | Name | Contents |
|---|---|---|---|
| 0 | 8 | Signature | Sig Rec |
| 8 | 4 | Length of File Table Data | Unit 32 |
| 12 | 2 | File Table Structure Type | Unit 16 (=0) |
| 14 | 2 | Number of File Records | Unit 16 |
| 16 | 2 | First Free File Record | Unit 16 |
| 18 | 2 | First Master File Record | Unit 16 |
| 20 | 12 | Reserve | #00 bytes |

In the data type field of the Signature (BP 0), 3 is set. In the Length of File Table Data (BP 8), a value obtained by multiplying the length of the file record by the Number of File Records is set. In the File Table Structure Type (BP 12), zero is set. The Number of File Records (BP 14) designates the number of file records constituting the file table. The number of file records is a value not less than 1 and not more than "#FFFF". The First Free File Record (BP 16) designates the first factor of the free file record chain. In the case where the file table has no free file record, "#FFFF" is set in the First Free File Record. In the First Master File Record (BP 18), the position of the first master file record is described. The Reserved (BP 20) is reserved for extensions, and "#00" is set in it.

The file record where the File Table Structure Type is zero is recorded as shown in Table 32.

TABLE 32

File Record of File Structure Type

| RBP | Length | Name | Contents |
|---|---|---|---|
| 0 | 1 | File Record Type | Unit 8 |
| 1 | 3 | Attribute | 3 bytes |
| 4 | 2 | File ID | Unit 16 |
| 6 | 2 | File Type | Unit 16 |
| 8 | 4 | Creation Time | Time Stamp |
| 12 | 4 | Modification Time | Time Stamp |
| 16 | 8 | Data Length | Unit 64 |
| 24 | 8 | Data Length | bytes |
| 32 | 2 | Child Link | Unit 16 |
| 34 | 2 | Next Link | Unit 16 |
| 36 | 2 | Parent Link | Unit 16 |
| 38 | 2 | X-Link | Unit 16 |

The File Record Type (RBP 0) designates the type of a file record. Based on this value, the free record, the directory record, the normal file record, the master file record, the shared file record, and the shared element record are identified. The Attribute (RBP I) designates the properties of the file record or data to be referred to by the file record. The File ID (RBP 4) designates a number for identifying file records of the file record chain that have the same file type. The File Type (RBP 6) designates a number for instructing the type of the file record. The Creation Time (RBP 8) designates the date and time of the creation of the file record. The Modification Time (RBP 12) designates the date and time of the changing of the file record or the data to be referred to by the file record.

The Data Length (RBP 16) designates, in bytes, the length of data to be referred to by the Data Location (RBP 24). In the case where there are no data to be referred to, zero is set. The Data Location (RBP 24) designates the position of data to be referred to by a file record in the case where the file record type is a normal file record, a master file record, or a shared element record. For the shared element record, this field represents an offset from the start of the master file. For the other cases, this field represents an allocation strategy number and an allocation extent record number in the format shown in Table 34. The Child Link (RBP 32) designates another file record in the file table. When the file record type is a directory record, this field designates a file record (normal file record, master file record or shared file record) belonging to the same directory or the first directory record as the directory. When the file record type is a master file record, this field designates a first shared element record referring to the master file record. When the file record type is a normal file record, "#FFFF" must be set in this field. When the file record type is a shared file record, this field designates a first shared element record constituting the shared file. When the file record type is a shared element record, this field designates another next shared element record referring to the same master file. A list of shared element records, formed by child link records using the master file record as the origin, are sorted based on the value of the Table Location field. In the Child Link field of the last shared element record of the list, "#FFFF" is set.

The Next Link (RBP 24) designates the file record number of the next file record constituting the file record chain. In the case where the file record is the last factor of the file record chain, "#FFFF" is set. When the file record is for any one of a directory record, a normal file record, master file record or a shared file record the Next Link designates the next file record (normal file record, master file record, or shared file record) belonging to the same directory or the next directory record belonging to the same directory. When the file record type is a shared element or, free record, the Next Link field designates another next shared element records belonging to the same shared file or, free records belonging to the free file record chain, respectively. This link is used for any one of indication of directory records, normal file records, and shared file records belonging to the same directory, indication of shared element records belonging to the same shared file, indication of free records belonging to the free file record chain, or indication of master file records belonging to the master file record chain.

The Parent Link (RBP 36) designates the file record number of a parent file record. In the case where the file record is a root file record, the file record's own record number, that is, zero is set in the Parent Link. In the case where the file record type is a shared element record, this field designates a shared file to which the shared element belongs. If the record file is of the type of a directory record, a normal file record, a master file record, or a shared file record, the Parent Link designates the directory record of the directory that either the directory record, normal file record, master file record, or shared file record, respectively belongs to.

When the file record type is not a shared element record, the X-Link (RBP 38) designates an extended attribute record for storing the extended attribute of the file record. The extended attribute record number of the first record of the extended attribute record chain is described in this field. In the case where an extended attribute record is not referred to, "#FFFF" is set in this field. When the file record type is a shared element record, this field designates a master file record to be referred to by the shared element record.

The Attribute field of Table 32 where the File Table Structure Type is zero is recorded as shown in Table 33.

TABLE 33

Attribute of the File Record

| Bit | Interpretation |
|---|---|
| 0 | Valid |
| 1–2 | Data Location Type |
| 3 | Protected |
| 4 | Sorted |
| 5–31 | Reserved |

The Valid (Bit 0) represents whether the file record is valid. The Data Location Type (Bits 0–1) designates the format of the Data Location (RBP 24).

The data location of Table 32 where the File Table Structure Type is zero is recorded as shown in Table 34.

TABLE 34

Data Location of the File Record

| BP | Length | Name | Contents |
|---|---|---|---|
| 0 | 2 | Reserved | #00 bytes |
| 2 | 2 | Allocation Strategy Number | Unit 16 |
| 4 | 4 | First Allocation Extent Record Number | Unit 32 |

The Protected (Bit 3) indicates that the file record is protected. The Sorted (Bit 4) indicates that in a file record chain to which the file record belongs, sorting has been performed on the file type and that in the same file type, sorting has been performed on the file ID. The Reserved (Bits 5–31) is reserved for extensions.

The allocation extents table data type of Table 32 includes an allocation extent table header and allocation extent records as shown in FIG. 16. The allocation extent records are number in sequential ascending order from zero. These numbers are called "allocation extent record numbers". A list of the allocation extent records is created by setting the allocation extent record number of the next record in the Next Allocation Extent Record field. This list is called an "allocation extent record chain".

The allocation extents table of FIG. 16 header, when the File Table Structure Type is zero, is recording as shown in Table 35.

TABLE 35

Allocation Extents Table Header

| BP | Length | Name | Contents |
|---|---|---|---|
| 0 | 8 | Signature | Signature |
| 8 | 4 | Number of Allocation Extent Records | Unit 32 |
| 12 | 4 | First Free Allocation Extent Record | Unit 32 |
| 16 | 4 | First Defective Allocation Extent Record | Unit 32 |
| 20 | 4 | Reserved | #00 bytes |

In the data type field of the Signature (BP 0), 4 is set. The Number of Allocation Extent Records (BP 8) designates the number of allocation extent records in the allocation extent table. The First Free Allocation Extent Record (BP 12) designates the first factor of a free allocation extent record chain.

In the case where the allocation extents table has no free allocation extent record, "#FFFFFFFF" is set in this field. The First Defective Allocation Extent Record (BP 16) designates the first defective allocation extent record chain. In the case where the allocation extents table has no defective allocation extent record, "#FFFFFFFF" is set in this field. The Reserved (BP 20) is reserved for extensions, and "#00" is set in it.

The Allocation Extent Record of FIG. 16 represents the start position, end position, properties the allocation extent, and the position of the next allocation extent record constituting the allocation extent record chain. The allocation extent record when the File table Structure Type is zero is recorded as shown in Table 36.

TABLE 36

Allocation Extents Record

| RBP | Length | Name | Contents |
|---|---|---|---|
| 0 | 4 | Start Logical Sector Number | Unit 32 |
| 4 | 1 | Allocation Strategy Number | Unit 8 |
| 5 | 1 | Reserved | Unit 8 |
| 6 | 2 | Start Offset | Unit 16 |
| 8 | 4 | End Logical Sector Number | Unit 32 |
| 12 | 2 | Reserved | Unit 16 |
| 14 | 2 | End Offset | Unit 16 |
| 16 | 4 | Attribute | Unit 32 |
| 20 | 4 | Next Allocation Extent Record | Unit 32 |
| 24 | 8 | Length of the Allocation Extent | Unit 64 |

The Start Logical Sector Number (RBP 0) designates a logical sector including the start byte of the allocation extent, and the logical sector number is set. The Allocation Strategy Number (RBP 4) indicates in accordance with which allocation strategy the allocation extent record is allocated. The Reserved (RBP 5) is reserved for extensions, "#00" is set in it. The Start Offset (RBP 6) designates a byte offset of the logical sector from its head byte to its start byte, which includes the start byte of the allocation extent, and zero is set in the Start Offset when the start position is equal to the head byte of the logical sector.

The End Logical Sector Number (RBP 8) designates the logical sector number of a logical sector including the end byte of the allocation extent. The Reserved (RBP 12) is reserved for extensions "#00" is set in it. The End Offset (RBP 14) designates an offset from the head byte to end byte of the logical sector including the end byte of the allocation extent, and zero is set when the end byte is equal to the head byte of the logical sector.

The possible values of the Attribute (RBP 16) of Table 36 are shown in Table 37.

TABLE 37

Attribute of the Allocation Extent Record

| Bit | Interpretation |
|---|---|
| 0–1 | Allocation Extent Record Status |
| 1–31 | Reserved |

In the case where the Allocation Extent Record Status (Bits 0–1) is "01" this allocation extent record designates a valid allocation extent, and normal reading can be performed. In the case where these bits are "11", the allocation extent record designates an invalid allocation extent, and indicates that normal reading cannot be performed due to the existence of a defective sector. In the case where these bits are "00", it is shown that the allocation extent record is not used at present and that the allocation extent record can be used when allocating a new allocation extent. In the case where these bits are "10", it is shown that although an allocation extent designated by the allocation extent record is not referred to, the use of the allocation extent is not appropriate for allocation of a new allocation extent since it includes a defective sector. The Reserved (Bits 2–31) is reserved for extensions, zero is set in it.

The Next Allocation Extent Record (RBP 20) of Table 36 designates the next allocation extent record number constituting the allocation extent record chain. In the case where the allocation extent record is the last factor of the allocation extent record chain, "#FFFFFFFF" is set in the Next Allocation Extent Record. The Length of the Allocation Extent (RBP 24) designates, in bytes, the length of the allocation extent designated by the allocation extent record. The number of bytes, computed based on the Start Logical Sector Number (RBP 0), the Start Offset.(RBP 6), the End Logical Sector Number (RBP 8), and the End Offset (RBP 14), is equal to the number of bytes set in the Length of the Allocation Extent field.

The allocation strategy table of Table 26 designates all allocation strategies used by the AV file system to allocate data in the logical volume. The allocation strategy table includes an allocation strategy table header and allocation strategy records, as shown in FIG. 17.

The allocation strategy table header is recorded as shown in Table 38.

TABLE 38

Allocation Strategy Table Header

| BP | Length | Name | Contents |
|---|---|---|---|
| 0 | 8 | Signature | Signature |
| 8 | 2 | Number of Allocation Strategy Record | Unit 16 |
| 10 | 6 | Reserved | #00 bytes |

In the data type field of the Signature (BP 0), 5 is set. The Number of Allocation Strategy Records (BP 8) designates the number of allocation strategy records in the allocation strategy table. The Reserved (RBP 10) is reserved for extensions, and "#00" is set in it.

The allocation strategy records are used to designate allocation strategies. Each allocation strategy record is recorded as shown in Table 39.

TABLE 39

Allocation Strategy Record of Allocation Strategy Type 0

| RBP | Length | Name | Contents |
|---|---|---|---|
| 0 | 2 | Length of Allocation Strategy Record | Unit 16 |
| 2 | 2 | Allocation Strategy Type | Unit 16 |
| 4 | 1 | Allocation Strategy Number | Unit 8 |
| 5 | 3 | Reserved | #00 bytes |
| 8 | $X_1$ | Allocation Strategy Type Dependent Data | bytes |

The length of Allocation Strategy Record (RBP 0) uses the number of bytes to designate the length of the allocation strategy record, which is a multiple of 8. The Allocation Strategy Type (RBP 2) designates the type of the allocation strategy record. The Allocation Strategy Number (RBP 4) designates a record order in the allocation strategy table, and zero is set when the first record is designated. The Reserved (RBP 5) is reserved for extensions, "#00" must be set in it. In the Allocation Strategy Type Dependent Data (RBP 8), predetermined contents are set for each allocation strategy type.

The allocation strategy record of Allocation Strategy Type 0 is recorded as shown in Table 40. In Allocation Strategy Type 0, the following conditions are satisfied. First, the allocation extent must be allocated in a region specified by the Start Logical Sector Number (RBP 8) and Logical Sector Number (RBP 12) in the allocation strategy record. Second, in the case where part of the logical sector is assigned to an allocation extent, the bytes of the logical sector do not belong to another allocation extent. Third, the head of the allocation extent must coincide with the head of the logical sector.

TABLE 40

Allocation Strategy Record of Allocation Strategy Type 0

| RBP | Length | Name | Contents |
|---|---|---|---|
| 0 | 2 | Length of Allocation Strategy Record | Unit 16 (=16) |
| 2 | 2 | Allocation Strategy Type | Unit 16 (=0) |
| 4 | 1 | Allocation Strategy Number | Unit 8 |
| 5 | 3 | Reserved | #00 bytes |
| 8 | 4 | Start Logical Sector Number | Unit 32 |
| 12 | 4 | End Logical Sector Number | Unit 32 |

In the length of Allocation Strategy Record (RBP 0), 16 is set. In the Allocation Strategy Type (RBP 2), zero is set. The Allocation Strategy Number (RBP 4) designates a record order in the allocation strategy table, and zero is set when the first record is designated. The Reserved (RBP 5) is reserved for extensions, and "#00" is set in it. The Start Logical Sector Number (RBP 8) designates a head logical sector number in a region in which the allocation extent is allocated. The End Logical Sector Number (RBP 12) designates an end logical sector number in which the allocation extent is allocated.

An allocation strategy record of Allocation Strategy Type 1 is recorded as shown in Table 41.

TABLE 41

Allocation Strategy Record of Allocation Strategy Type 1

| RBP | Length | Name | Contents |
|---|---|---|---|
| 0 | 2 | Length of Allocation Strategy Record | Unit 16 |
| 2 | 2 | Allocation Strategy Type | Unit 16 (=1) |
| 4 | 1 | Allocation Strategy Number | Unit 8 |
| 5 | 3 | Reserved | #00 bytes |
| 8 | 2 | Number of Zones (=$x_1$) | Unit 16 |
| 10 | 6 | Reserved | #00 bytes |
| 16 | $16x_1$ | Zone Information Records | |

In the length of Allocation Strategy Record (RBP 0), the length of this allocation strategy record, 16+16(1, is set. In the Allocation Strategy Type, 1 is set. The Allocation Strategy Number (RBP 4) designates a record order in the allocation strategy table, and zero is set when the first record is designated. The Reserved (RBP 5) is reserved for extensions, "#00" is set in it. The Number of Zones (RBP 8) designates the number of zone information records in the allocation strategy records. The Reserved (RBP 10) is reserved for extensions, "#00" is set in it. In the Zone Information Records (BP 16), zone information records corresponding to a number designed by the Number of Zones (RBP 8) is set. Each zone information record of Table 41 is recorded as shown in Table 42.

TABLE 42

Zone Information Record

| RBP | Length | Name | Contents |
|---|---|---|---|
| 0 | 4 | Start Logical Sector Number | Unit 32 |
| 4 | 4 | End Logical Sector Number | Unit 32 |
| 8 | 4 | Lengthy of Allocation Unit | Unit 32 |
| 12 | 4 | Reserved | #00 bytes |

The Start Logical Sector Number (RBP 0) designates a start logical sector number for the zone. The End Logical Sector Number (RBP 4) designates an end logical sector number for the zone. The Length of Allocation Unit (RBP 8) designates an allocation unit used when allocation is performed in the zone. The Reserved (RBP 12) is reserved for extensions, and "#00" is set in it.

In the defect information table of Table 26, the logical sector number of a defective sector in the logical volume is recorded. The defect information table is recorded as shown in Table 43.

TABLE 43

Defect Information Table

| RBP | Length | Name | Contents |
|---|---|---|---|
| 0 | 8 | Signature | Signature |
| 8 | 4 | Number of Defect Sectors (=$x_1$) | Unit 32 |
| 12 | 4 | Reserved | #00 bytes |
| 16 | $4x_1$ | Defect Sector Addresses | bytes |

In the data type field of the Signature (BP 0), 6 is set. The Number of Defect Sectors (BP 8) designates the number of entries of defect sector addresses starting at BP 16. The Reserved (BP 12) is reserved for extensions, and "#00" is set in it. The Defect Sector Addresses (BP 16) designates the logical sector numbers of defect sectors detected in the logical volume. One entry comprises Unit 32, and values recorded in this field are sorted in ascending order.

The extended attribute table of Table 26 includes an extended attribute table header and extended attribute records, as shown in FIG. 18. The extended attribute records are numbered in sequential ascending order from zero, and these numbers are called "extended attribute record numbers". A list of extended attribute records is created by setting the next record in the Next Extended Attribute Record field, and this list is called an "extended attribute record chain". Extended attribute records in the extended attribute table that are not used create a list called a "free extended attribute record chain".

The extended attribute table header is recorded as shown in Table 44.

TABLE 44

Extended Attribute Table Header

| BP | Length | Name | Contents |
|---|---|---|---|
| 0 | 8 | Signature | Signature |
| 8 | 2 | Number of Extended Attribute Records | Unit 16 |
| 10 | 2 | First Free Extended Attribute | Unit 16 |
| 12 | 4 | Reserved | #00 bytes |

In the data type field of the Signature (BP 0), 7 is set. The Number of Extended Attribute Record (BP 8) designates the number of extended attribute records in the extended attribute table, which is "#FFF0" or less. The First Free Extended Attribute Record (BP 10) designates the first factor of the free extended attribute record chain, and "#FFFF" is set in this field in the case where the extended attribute table has no free extended attribute record. The Reserved (RNP 12) is reserved for extensions, and "#00" is set in it.

Each extended attribute record of FIG. 18 is recorded as shown in Table 45.

TABLE 45

Extended Attribute Record

| RBP | Length | Name | Contents |
|---|---|---|---|
| 0 | 2 | Next Extended Attribute Record | Unit 16 |
| 2 | 30 | Extended Attribute Information | Bytes |

The Next Extended Attribute Record (RBP 0) designates the next extended attribute record number constituting the extended attribute record chain, and when this extended attribute record is the last extended attribute record, "#FFFF" is set.

Many conventional file systems are designed on the assumption that processing of defective sectors of a recording medium is performed by a processing layer (e.g., drive's internal alternate processing) below the standard file system. Thus, such a standard file system cannot detect the position of a defective sector. While in sectors of a recording medium having no defects data can be accessed at a standard, original transfer rate of the reproducing drive, in sectors including one or more defects, data can be accessed only at a transfer rate much lower than the standard, original rate.

For conventional uses of computers, it is desired to decrease the average access time to access data, but it is not required to estimate this access time in any way. It is also not necessary that this access time be constant. Thus, the use of the above-described construction including the use of a second layer for processing defective sectors when recording and reproducing computer data does not pose a problem. This is because changes in the data rate can be easily absorbed by a data buffer or the like in such a computer system. However, for audio and video uses, sound and picture data cannot be appropriately recorded or reproduced unless a constant amount of data is supplied in a constant time. To solve this problem, it is necessary that a file system estimate a time for accessing data.

Accordingly, by providing a system in accordance with the invention that does not perform defective sector processing in a lower processing layer, this file system can estimate an accurate average time for accessing data. With this introduction, fields and flags for defective sector processing that are not used in the conventional file systems are provided in the file system of the invention. By using these flags, defective sector processing can be performed. A method of defective sector processing using a function provided in this file system of the invention will now be described.

In general, a defective sector my be detected in any one of the following cases. First, a detective sector may be detected when an error occurs during writing of the data. Second, although writing has normally ended, an error may be detected after writing when the written data are read to confirm proper recording. Third, although writing and reading just after writing has normally ended does not indicate an error, an error may be detected when reading is later performed.

For the first and second cases, by performing reading just after writing for verification of whether normal writing has been performed, an error generated during writing can be detected.

Errors detected in the third case may be generated by dust or scratches on an optical disk upon which the data has been recorded. Although there is no way to insure that such a defect does not disrupt data, writing the data in multiple locations can greatly reduce the chances of data loss. The file system of the invention performs defective sector processing by using mainly two techniques, writing and verification, and multiple writing.

The volume structure of a recording medium is defined based on the volume structure descriptor, the media information descriptor, the drive information descriptor, and the extended data descriptor, as described above. The following measures for recording these types of information cope with the possibility of defective sectors on the recording medium.

The volume structure descriptor, the media information descriptor, the drive information descriptor, and the extended data descriptor are managed by the MIA. The MIA can be securely recorded in a non-defective sector by always performing writing and verification. Also, in order to deal with a defect that might be generated after recording, the MIA is redundantly recorded at two positions within the volume, and the MIA map managing the utilization of the MIA is also redundantly recorded at two positions.

In the logical volume defined by the volume management system using defect management, slipping and linear replacement are performed for each partition of the logical volume.

The AV file system in accordance with the invention handles defective sectors in the following manner. The AV file system executes writing and verification to verify completion of normal writing when performing writing to the AV file system descriptor. When this verification indicates that the AV file system has failed to perform proper writing of the data, it writes the AV file system descriptor at another position of the volume, and changes the contents of the Logical Volume Contents Use field to reflect the change in the location of the AV file system descriptor. Also, it increases reliability by writing the AV file system descriptor at two positions in the volume.

The AV file system of the invention also executes writing and verification to verify completion of normal writing when writing to sectors in an MIA. When a writing procedure has failed, the AV file system writes "#FFF0" in the Entry field of the MIA map corresponding to the location of the failed writing, and executes the same writing and verification sequence on other sectors in the MIA, or in another MIA. Also, the AV file system of the invention increases reliability by writing the MIA itself in a logical volume.

A defective sector detected by the AV file system is registered in the defect information table, and the sector is not used for any recording in the future.

For data to be recorded in the allocation extent, only the write operation can be executed. This is because the write-and-verify operation cannot be executed because it would take too long because of the requested data type. In any case, when a defective sector is detected, the AV file system treats this sector as an independent allocation extent, and sets "10" in the Allocation Extent Record Status, thereby putting the allocation extent in the defective allocation extent record chain. When a defective sector is detected in an allocation extent during reading, the AV file system sets "11" in the Allocation Extent Record Status. When this allocation extent is released, the defective sector is inspected, and the portion of the defective sector is registered as a defective allocation extent of Allocation Extent Record Status 10 in the defective allocation extent record chain.

Figure 19:
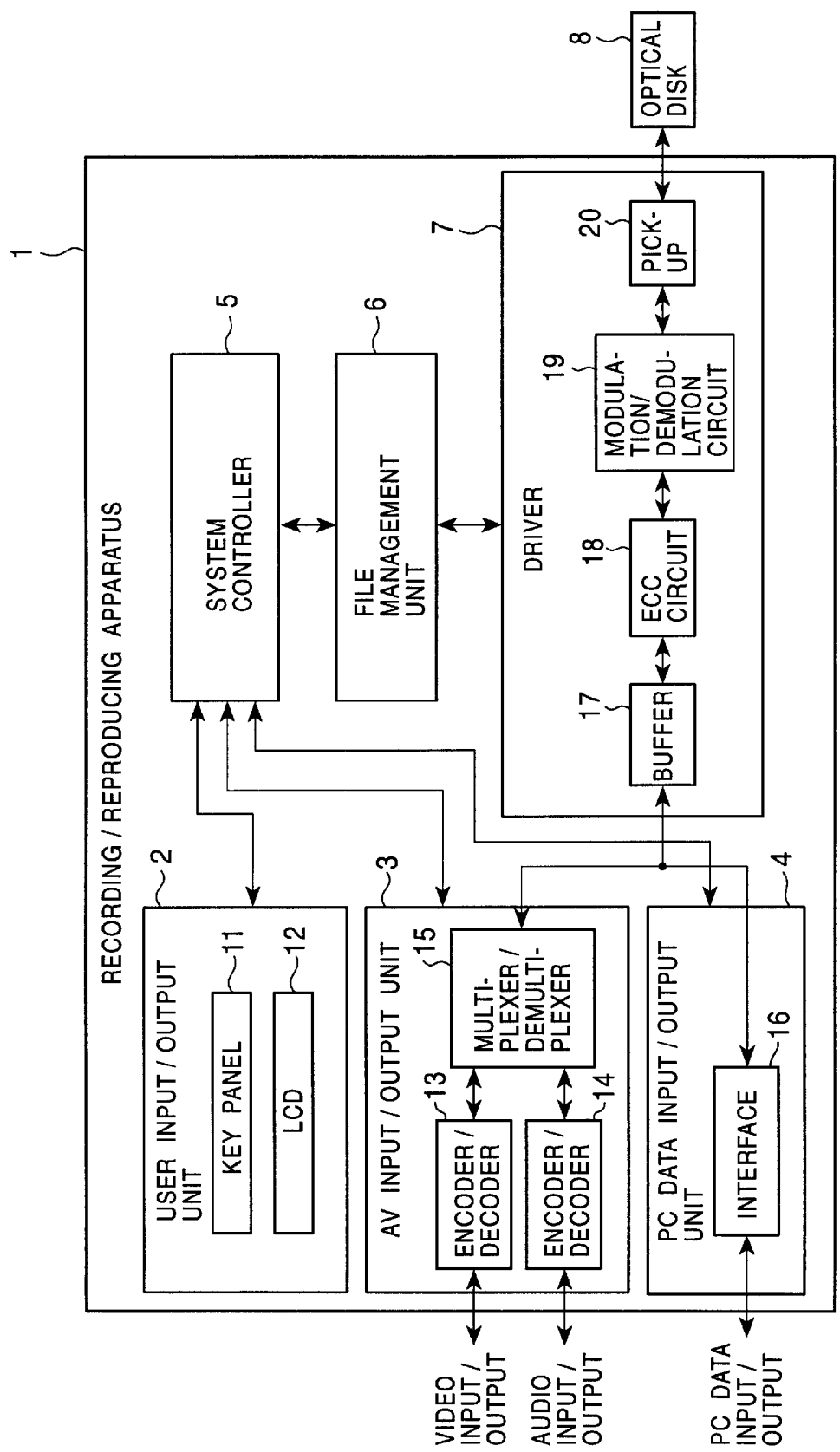
FIG. 19 is a block diagram depicting an embodiment of a recording/reproducing apparatus constructed in accordance with the invention.

FIG. 19 is a block diagram showing an embodiment of a recording/reproducing apparatus 1 of the present invention. An optical disk 8 is loaded in recording/reproducing apparatus 1 for recording and playback. The recording/reproducing apparatus 1 records, on the optical disk 8, video signals, audio signals, and personal computer (PC) data supplied from an external source, or reads and externally outputs signals recorded on optical disk 8.

A user input/output unit 2 has a key panel 11 and a liquid crystal display (LCD) 12. Key panel 11 generates signals in accordance with user operations, and supplies them to a system controller 5. LCD 12 displays, based on the signals supplied from system controller 5, information regarding the condition of the recording/reproducing apparatus 1 or information on the optical disk 8 loaded into the recording/reproducing apparatus 1, etc.

An AV input/output unit 3 controls an included encoder/decoders 13 and 14 and an included multiplexer/demultiplexer 15, based on signals supplied from system controller 5. AV input/output unit 3 also supplies system controller 5 with signals representing the condition of encoder/decoders 13 and 14 and multiplexer/demultiplexer 15.

Encoder/decoder 13 compresses (encodes) and outputs externally supplied video signals to multiplexer/demultiplexer 15 in a recording mode, and decompresses (decodes) and externally outputs predetermined-standard video data supplied from multiplexer/demultiplexer 15 in a reproducing mode. Encoder/decoder 14 compresses (encodes) externally supplied audio signals and outputs predetermined-standard audio data adapted for the audio signals to multiplexer/demultiplexer 15 in the recording mode, and decompresses (decodes) and externally outputs the predetermined-standard audio data supplied from multiplexer/demultiplexer 15 in the reproducing mode.

In recording mode, multiplexer/demultiplexer 15 multiplexes the predetermined-standard video data and audio data supplied from encoder/decoders 13 and 14, and outputs the multiplexed data to a driver 7. In reproducing mode, multiplexer/demultiplexer 15 separates the multiplex video data and audio data supplied from driver 7, multiplexer/demultiplexer 15 outputs the video data and the audio data to encoder/decoder 13 and encoder/decoder 14, respectively.

A PC data input/output unit 4 includes an interface 16. PC data input/output unit 4 controls, based on a signal supplied from system controller 5, interface 16, and outputs a signal representing the condition of interface 16. Predetermined-format PC data supplied from an external personal computer or the like (not shown) are input to interface 16. Interface 16 converts the input data into data that can be read by driver 7, and outputs the converted data to driver 7. Interface 16 outputs, in a predetermined format to the external personal computer or the like, data supplied from driver 7.

Based on the condition of each of user input/output unit 2, AV input/output unit 3, PC data input/output unit 4, and file management unit 6, system controller 5 controls user input/output unit 2, AV input/output unit 3, PC data input/output unit 4, and file management unit 6. Based on a signal from system controller 5, file management unit 6 controls driver 7 and supplies system controller 5 with a signal in accordance with the condition of driver 7.

Driver 7 includes a buffer 17, an ECC circuit 18, a modulation/demodulation circuit 19, and a pickup 20. Based on a signal from file management unit 6, driver 7 drives buffer 17, ECC circuit 18, modulation/demodulation circuit 19, and pickup 20, whereby signals are recorded on optical disk 8 or are read from optical disk 8.

Buffer 17 temporarily stores data supplied from AV input/output unit 3 or PC data input/output unit 4, and outputs the data to ECC (error correction code) circuit 18 so that the data are not interrupted. Buffer 17 also temporarily stores data supplied from ECC circuit 18, and supplies this information at a uniform rate to AV input/output unit 3 or PC data input/output unit 4 so that the data are not interrupted.

During recording ECC circuit 18 adds error correction codes to the data supplied from buffer 17, and outputs the sums of the supplied data and the error correction codes to modulation/demodulation circuit 19. During reproduction ECC circuit 18 performs error correction based on the added error correction codes, and outputs the error-corrected data to buffer 17.

During recording modulation/demodulation circuit 19 modulates the data supplied from ECC circuit 18 in accordance with a predetermined-standard data, and outputs the modulated data to pickup 20. During reproduction modulation/demodulation circuit 19 uses the predetermined standard to demodulate the data supplied from pickup 20, and outputs the demodulated data to ECC circuit 18. Based on the data supplied from modulation/demodulation circuit 19, pickup 20 records data on optical disk 8 loaded into the recording/reproducing apparatus 1, or reads and outputs data recorded on optical disk 8 to modulation/demodulation circuit 19, as appropriate.

Figure 20A:
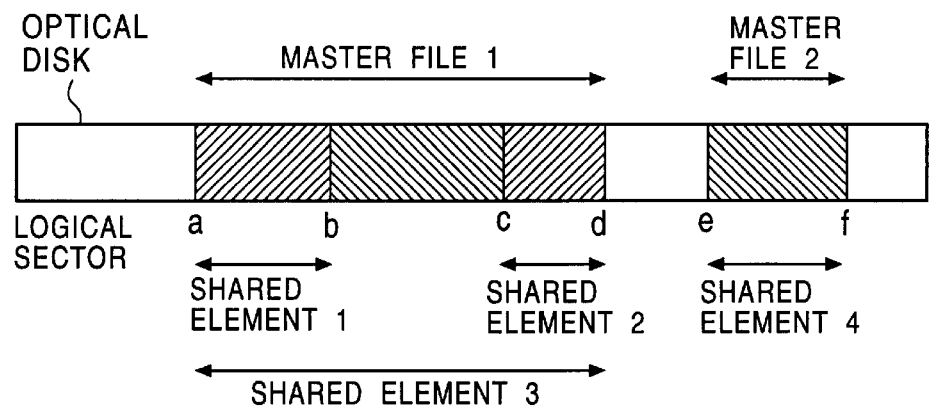
FIGS. 20A, 20B, 20C, and 20D depict a relationship among master files, shared files, and shared elements in accordance with the invention.
Figure 20B:
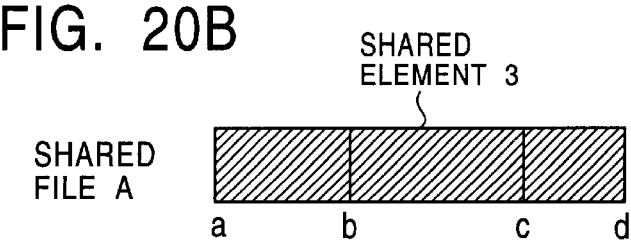
Figure 20C:
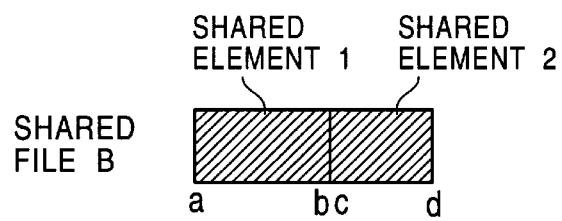

Next, making reference to FIGS. 20A, 20B, and 20C, file management as performed by the file management unit 6 of FIG. 19 in accordance with the invention is described. Consecutive data recorded on optical disk 8 are managed as master files. In the example shown in FIG. 20A, two master files, master file 1 and master file 2, are recorded. Each master file has one-to-one correspondence with a set of AV data. Portions of these recorded master files are managed as shared files including shared elements, to allow sharing during editing. In this example, portions of master file 1 are referred to as a shared file A (shown in FIG. 20B) and a shared file B (shown in FIG. 20C). Each shared file includes at least one shared element. In the example shown in FIG. 20B, shared file A consists of shared element 3 from logical sector "a" to logical sector "d", and shared file B consists of shared element 1 from logical sector "a" to logical sector "b" and shared element 2 from logical sector "c" to logical sector "d", as shown in FIG. 20A. Each shared element indicates continuous regions formed in each master file.

Figure 20D:
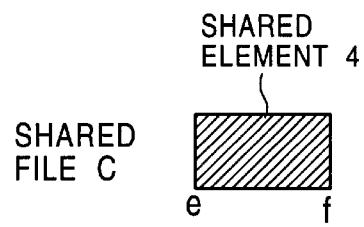

In addition, master file 2 consists of only shared file C (shown in FIG. 20D) composed of shared element 4. Shared element 4 defines the region from logical sector "e" to logical sector "f". In other words, what is generally recognized as a single file by a user is actually one or more shared files from a master file, as set forth in these examples. The recorded file information indicates what portion of the master file is to be reproduced, but the portions of the master file need not be recorded twice, even if they are referred to and used twice. The actual master files are not directly accessible by the user, and are also not normally reproduced in their entirety after editing.

Figure 21:
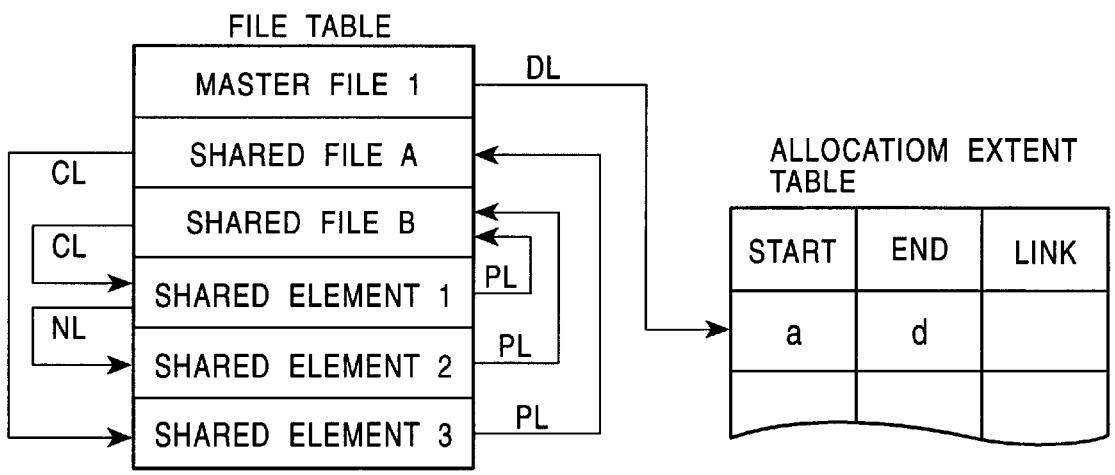
FIG. 21 further depicts the relationship among a master file, shared files, and shared elements in accordance with the invention.

FIG. 21 is a schematic drawing showing an example of the file table of FIG. 15 in the case where the above-described master file 1 is recorded on the optical disk 8 (FIG. 19). The file table provides a logical relationship between the various master files, shared files and shared elements. As is shown in FIG. 15, the file table consists of the file table header (shown in Table 31) and an arbitrary number of file records (as shown in Table 32). In the example shown in FIG. 21, master file 1, shared file A, shared file B, shared element 1, shared element 2, and shared element 3 are recorded as file records. In FIG. 21, the file table header is not shown for brevity.

In the Data Location of the file record of master file 1, a pointer (DL) is described that represents the recording position (where the start point is logical sector "a" and the end point is logical sector "d") of master file 1 on the optical disk 8 in the allocation extent table. In other words, by referring to a predetermined position in the allocation extent table indicated by a pointer DL existing in the file record as master file 1, actual AV data of master file 1, recorded from logical sector "a" to logical sector "d", are recognized.

Shared file A uses its Child Link (CL) to describe shared element 3. This makes it possible to recognize that shared file A consists of single shared element 3. Also, shared element 3 describes, in its Parent Link, shared file A, whereby it is possible to recognize shared element 3 belongs to shared file A.

Shared file B describes, in its Child Link, shared element 1, and shared element 1 describes, its Next Link (NL), shared element 2. Shared element 2 describes nothing in its Next Link because it is the last shared element constituting shared file B. Accordingly, this makes it possible to recognize that shared file B consists of shared element 1 and shared element 2. In the Parent Links of shared element 1 and shared element 2, shared file B is described, which makes it possible to recognize that shared element 1 and shared element 2 belong to shared file B.

Figure 22:
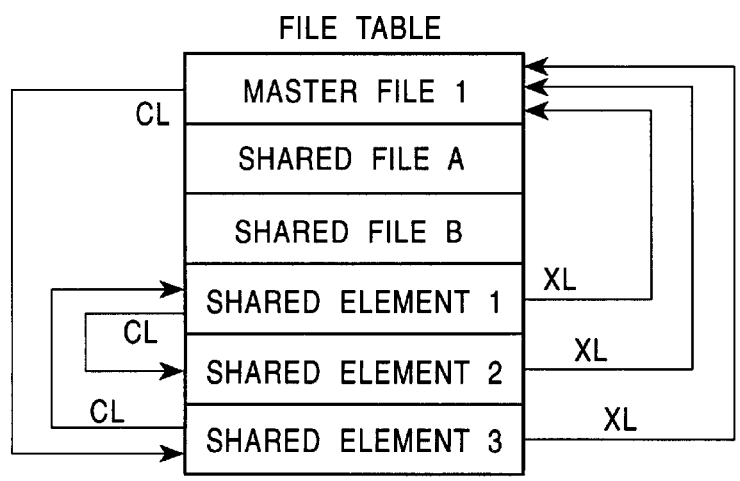
FIG. 22 further depicts the relationship among a master file, shared files, and shared elements in accordance with the invention.

FIG. 22 shows a link relationship using master file 1 as a reference. As shown in FIG. 22, master file 1 describes, as its Child Link, shared element 3. Shared element 3 describes, as its Child Link, shared element 1, and shared element 1 describes, as its Child Link, shared element 2. This makes it possible to recognize that master file 1 is related not only with shared element 1 and shared element 2 but also with shared element 3. In the X Links (XL) of shared element 1 to shared element 3, master file 1 is described.

A computer program implementing the above-described processing may be provided on, in addition to recording media such as magnetic disks, CD-ROMs, and solid-state memories, communication media such as a network and a satellite link, or the like.

According to the file management apparatus of the invention, file division or linkage by editing or the like may be performed, and a plurality of files may refer to the same recorded data without copying of the recorded data to additional locations on the recording medium.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A file management apparatus for managing the files of audio and/or video data to be recorded on or reproduced from a recording medium, said file management apparatus comprising:

means for selecting one of a plurality of predefined allocation strategy types;

means for selecting an allocation extent in accordance with a type of data to be recorded or reproduced from one or more presented allocation extents, corresponding to said selected allocation strategy type;

first means for managing a master file recorded on said medium;

second means for designating at least part of said master file corresponding to one or more of said allocation extents as at least one shared element; and third means for managing one or more of said shared elements as one or more shared files in order to enable a plurality of said shared files to refer to the same shared element.

2. The file management apparatus of claim 1, further comprising means for linking said one shared element to another of said shared elements to manage the linked elements as said shared file.

3. The file management apparatus of claim 1, further comprising means for linking said shared element to said master file with which said shared element is associated with.

4. The file management apparatus of claim 1, further comprising means for linking said master file to said first shared element pointing to said master file.

5. The file management apparatus of claim 1, further comprising means for linking said shared file to the first shared element associated with said shared file.

6. The file management apparatus of claim 1, further comprising means for linking said shared element to a next shared element pointing to the same master file.

7. The file management apparatus of claim 1, further comprising means for linking said master file to one of a next master file or a next shared file belonging to a same directory as said master file.

8. The file management apparatus of claim 1, further comprising means for linking said shared file to one of a next master file or a next shared file belonging to a same directory as said shared file.

9. The file management apparatus of claim 1, further comprising means for linking said master file to a directory to which the master file belongs.

10. The file management apparatus of claim 1, further comprising means for linking said shared file to a directory to which the shared file belongs.

11. The file management apparatus of claim 1, further comprising means for linking said master file to an extended attribute record.

12. The file management apparatus of claim 1, further comprising means for linking said shared file record to an extended attribute record.

13. A file management method for managing the files of audio and/or video data to be recorded on or reproduced from a recording medium, said file management method comprising the steps of:

means for selecting one of a plurality of predefined allocation strategy types;

means for selecting an allocation extent in accordance with a type of data to be recorded or reproduced from one or more presented allocation extents, corresponding to said selected allocation strategy type;

managing a master file recorded on said medium;

designating at least part of said master file corresponding to one or more of said allocation extents as at least one shared element; and managing one or more of said shared elements as one or more shared files in order to enable a plurality of said shared files to refer to the same shared element.

14. The file management method of claim 13, further comprising the step of linking said one of shared element to another of said shared elements to manage the linked elements as said shared file.

15. The file management method of claim 13, further comprising the step of linking said shared element to said master file with which said shared element is associated.

16. The file management method of claim 13, further comprising the step of linking said master file to said first shared element pointing to said master file.

17. The file management method of claim 13, further comprising the step of linking said shared file to the first shared element associated with said shared file.

18. The file management method of claim 13, further comprising the step of linking said shared element to a next shared element pointing to the same master file.

19. The file management method of claim 13, further comprising the step of linking said master file to one of a next master file or a next shared file belonging to a same directory as said master file.

20. The file management method of claim 13, further comprising the step of linking said shared file to one of a next master file or a next shared file belonging to a same directory as said shared file.

21. The file management method of claim 13, further comprising the step of linking said master file to a directory to which the master file belongs.

22. The file management method of claim 13, further comprising the step of linking said shared file to a directory to which the shared file belongs.

23. The file management method of claim 13, further comprising the step of linking said master file to an extended attribute record.

24. The file management method of claim 13, further comprising the step of linking said shared file record to an extended attribute record.

25. A recording medium having instructions recorded thereon for managing the files of audio and/or video data to be recorded on or reproduced therefrom, said instructions comprising:

means for selecting one of a plurality of predefined allocation strategy types;

means for selecting an allocation extent in accordance with a type of data to be recorded or reproduced from one or more presented allocation extents, corresponding to said selected allocation strategy type;

an instruction for managing a master file recorded on said medium;

an instruction for designating at least part of said master file corresponding to one or more of said allocation extents as at least one shared element; and an instruction for managing one or more of said shared elements as one or more shared files in order to enable a plurality of said shared files to refer to the same shared element.

26. The recording medium of claim 25, further comprising an instruction for linking said one shared element to another of said shared elements to manage the linked elements as said shared file.

27. The recording medium of claim 25, further comprising an instruction for linking said shared element to said master file with which said shared element is associated.

28. The recording medium of claim 25, further comprising an instruction for linking said master file to said first shared element pointing to said master file.

29. The recording medium of claim 25, further comprising an instruction for linking said shared file to the first shared element associated with said shared file.

30. The recording medium of claim 25, further comprising an instruction for linking said shared element to a next shared element pointing to the same master file.

31. The recording medium of claim 25, further comprising an instruction for linking said master file to one of a next master file or a next shared file belonging to a same directory as said master file.

32. The recording medium of claim 25, further comprising an instruction for linking said shared file to one of a next master file or a next shared file belonging to a same directory as said shared file.

33. The recording medium of claim 25, further comprising an instruction for linking said master file to a directory to which the master file belongs.

34. The recording medium of claim 25, further comprising an instruction for linking said shared file to a directory to which the shared file belongs.

35. The recording medium of claim 25, further comprising an instruction for linking said master file to an extended attribute record.

36. The recording medium of claim 25, further comprising an instruction for linking said shared file record to an extended attribute record.

37. A recording medium for storing audio and/or video data, comprising:

means for selecting one of a plurality of predefined allocation strategy types;

means for selecting an allocation extent in accordance with a type of data to be recorded or reproduced from one or more presented allocation extents, corresponding to said selected allocation strategy type;

a data region for storing audio and/or video data a master file, and a control region for storing file management information designating at least part of said master file corresponding to one or more of said allocation extents as at least one shared element, and managing one or more of said shared elements as one or more shared files in order to enable a plurality of said shared files to refer to the same shared element.

38. The recording medium of claim 37, wherein said control region further stores file management information linking said one of said shared element to another of said shared element to manage the linked elements as said shared file.

39. The recording medium of claim 37, wherein said control region further stores file management information linking said shared element to said master file with which the shared element is associated.

40. The recording medium of claim 37, wherein said control region further stores file management information linking said master file to said first shared element pointing to the master file.

41. The recording medium of claim 37, wherein said control region further stores file management information linking said shared file to a first shared element associated with said shared file.

42. The recording medium of claim 37, wherein said control region further stores file management information linking said shared element to a next shared element pointing to the same master file.

43. The recording medium of claim 37, wherein said control region further stores file management information linking said master file to one of a next master file or a next shared file belonging to a same directory as said master file.

44. The recording medium of claim 37, wherein said control region further stores file management information linking said shared file to one of a next master file or a next shared file belonging to same directory as said shared file.

45. The recording medium of claim 37, wherein said control region further stores file management information linking said master shared file to a directory to which the shared file belongs.

46. The recording medium of claim 37, wherein said control region further stores file management information linking said shared file to a directory to which the master file belongs.

47. The recording medium of claim 37, wherein said control region further stores file management information linking said master file to an extended attribute record.

48. The recording medium of claim 37, wherein said control region further stores file management information linking said shared file record to an extended attribute record.

* * * * *